United States Patent
Dinan

(10) Patent No.: US 10,271,371 B2
(45) Date of Patent: *Apr. 23, 2019

(54) CONTROL CHANNEL OF A SECONDARY CELL IN A TIMING ADVANCE GROUP

(71) Applicant: Ofinno Technologies, LLC, Herndon, VA (US)

(72) Inventor: Esmael Hejazi Dinan, Herndon, VA (US)

(73) Assignee: Ofinno Technologies, LLC, Reston, VA (US)

( * ) Notice: Subject to any disclaimer, the term of this patent is extended or adjusted under 35 U.S.C. 154(b) by 292 days.

This patent is subject to a terminal disclaimer.

(21) Appl. No.: 15/058,957

(22) Filed: Mar. 2, 2016

(65) Prior Publication Data

US 2016/0270071 A1    Sep. 15, 2016

Related U.S. Application Data

(60) Provisional application No. 62/133,944, filed on Mar. 16, 2015, provisional application No. 62/130,571, filed on Mar. 9, 2015.

(51) Int. Cl.
*H04L 1/00* (2006.01)
*H04L 1/18* (2006.01)
(Continued)

(52) U.S. Cl.
CPC .......... *H04W 76/27* (2018.02); *H04L 1/1825* (2013.01); *H04L 1/1854* (2013.01); *H04L 5/001* (2013.01);
(Continued)

(58) Field of Classification Search
CPC ..... H04L 5/001; H04L 5/0098; H04L 1/1825; H04L 5/0055; H04L 1/1854;
(Continued)

(56) References Cited

U.S. PATENT DOCUMENTS

2010/0074202 A1* 3/2010 Park .................... H04W 56/004
370/329
2012/0082107 A1* 4/2012 Ou .................... H04W 74/0833
370/329

(Continued)

FOREIGN PATENT DOCUMENTS

EP    2595333 A2    5/2013

OTHER PUBLICATIONS

3GPP TS 36.133 V12.6.0 (Dec. 2014), Technical Specification, 3rd Generation Partnership Project; Technical Specification Group Radio Access Network; Evolved Universal Terrestrial Radio Access (E-UTRA); Requirements for support of radio resource management, Valbonne, France.

(Continued)

*Primary Examiner* — Oussama Roudani
(74) *Attorney, Agent, or Firm* — David Grossman; Esmael Dinan; Kavon Nasabzadeh

(57) ABSTRACT

Cells are grouped into a plurality of timing advance groups (TAGs) and a plurality of physical uplink control channel (PUCCH) groups. The PUCCH groups comprise a primary PUCCH group comprising a primary cell and a secondary PUCCH group comprising a PUCCH secondary cell. The PUCCH secondary cell is in a first TAG. When a time alignment timer of the first TAG expires, the wireless device notifies a radio resource control layer to release the secondary PUCCH, and stops transmission of positive acknowledgement or negative acknowledgement for a downlink HARQ process of an activated cell in the secondary PUCCH group.

20 Claims, 27 Drawing Sheets

(51) Int. Cl.
*H04L 5/00* (2006.01)
*H04W 56/00* (2009.01)
*H04W 76/27* (2018.01)

(52) U.S. Cl.
CPC .......... *H04L 5/0055* (2013.01); *H04L 5/0098* (2013.01); *H04L 1/0026* (2013.01); *H04L 1/1848* (2013.01); *H04L 5/0053* (2013.01); *H04W 56/0045* (2013.01)

(58) Field of Classification Search
CPC ... H04L 5/0053; H04L 1/0026; H04L 1/1848; H04W 76/046; H04W 56/0045; H04W 76/1854
See application file for complete search history.

(56) References Cited

U.S. PATENT DOCUMENTS

| | | | |
|---|---|---|---|
| 2012/0257570 A1* | 10/2012 | Jang | H04W 76/19 370/328 |
| 2013/0188612 A1 | 7/2013 | Dinan | |
| 2013/0188617 A1* | 7/2013 | Dinan | H04W 56/0005 370/336 |
| 2013/0272233 A1 | 10/2013 | Dinan | |
| 2014/0092865 A1* | 4/2014 | Heo | H04W 4/70 370/331 |
| 2014/0161110 A1* | 6/2014 | Kim | H04L 5/001 370/336 |
| 2016/0044617 A1* | 2/2016 | Vajapeyam | H04W 56/0005 370/336 |
| 2016/0219577 A1* | 7/2016 | Yang | H04W 72/042 |
| 2016/0255621 A1* | 9/2016 | Wu | H04W 72/0413 370/329 |
| 2016/0270112 A1* | 9/2016 | Dinan | H04L 5/00 |
| 2017/0208581 A1* | 7/2017 | Yang | H04W 72/14 |

OTHER PUBLICATIONS

3GPP TS 36.211 V12.4.0 (Dec. 2014), Technical Specification, 3rd Generation Partnership Project; Technical Specification Group Radio Access Network; Evolved Universal Terrestrial Radio Access (E-UTRA); Physical channels and modulation, 3GPP, Valbonne, France.
3GPP TS 36.212 V12.3.0 (Dec. 2014), Technical Specification, 3rd Generation Partnership Project; Technical Specification Group Radio Access Network; Evolved Universal Terrestrial Radio Access (E-UTRA); Multiplexing and channel coding, 3GPP, Valbonne, France.
3GPP TS 36.213 V12.4.0 (Dec. 2014), Technical Specification, 3rd Generation Partnership Project; Technical Specification Group Radio Access Network; Evolved Universal Terrestrial Radio Access (E-UTRA); Physical layer procedures, Valbonne, France.
3GPP TS 36.300 V12.4.0 (Dec. 2014), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2, Valbonne, France.
3GPP TS 36.321 V12.4.0 (Dec. 2014), Technical Specification, 3rd Generation Partnership Project; Technical Specification Group Radio Access Network; Evolved Universal Terrestrial Radio Access (E-UTRA); Medium Access Control (MAC) protocol specification, Valbonne, France.
3GPP TS 36.331 V12.4.1 (Dec. 2014), Technical Specification, 3rd Generation Partnership Project; Technical Specification Group Radio Access Network; Evolved Universal Terrestrial Radio Access (E-UTRA); Radio Resource Control (RRC); Protocol specification, Valbonne, France.
3GPP TSG RAN WG1 Meeting #80 R1-150291, Athens, Greece, Feb. 9-13, 2015, Agenda item: 7.2.2.1, Source: NEC, Title: Initial considerations on SCell PUCCH for CA.
3GPP TSG RAN WG2 Meeting #89 R2-150169, Athens, Greece, Feb. 9-13, 2015, Souce: Intel Corporation, Title: Considerations for PUCCH on SCell in carrier aggregation.
3GPP TSG RAN WG2 Meeting #89 R2-150263, Athens, Greece, Feb. 9-13, 2015, Source: CATT, Title: Introduction of PUCCH Cell Group.
3GPP TSG RAN2 Meeting #89 R2-150395, Athens, Greece, Feb. 9-13, 2015, Source: NEC, Title: Coexistence of SCell PUCCH with MTA and DC.
3GPP TSG-RAN WG2 Meeting #89 R2-150527, Athens, Greece, Feb. 9-13, 2015, Source: Qualcomm Incorporated, Title: General principles for the support of PUCCH on SCell.
3GPP TSG-RAN WG2 meeting #89 R2-150149, Athens, Greece, Feb. 9-13, 2015, Source: ZTE, Title: The principle of grouping PUCCH cell.
3GPP TSG-RAN WG2 meeting #89 R2-150151, Athens, Greece, Feb. 9-13, 2015, Source: ZTE, Title: Discussion on the impact for the support of PUCCH on SCell.
3GPP TSG-RAN WG2 Meeting #89 R2-150371, Athens, Greece, Feb. 9-13, 2015, Source: Huawei, HiSilicon, Title: Scenario and terminology for multiple PUCCHs.
3GPP TSG-RAN WG2 Meeting #89 R2-150372, Athens, Greece, Feb. 9-13, 2015, Source: Huawei, HiSilicon, Title: Introduce PUCCH on SCell for CA beyond 5 carriers.
3GPP TSG-RAN WG2 Meeting#89 R2-150238, Athens, Greece, Feb. 9-13, 2015, Source: Fujitsu, Title: Discussion on the PUCCH support on SCell.

* cited by examiner

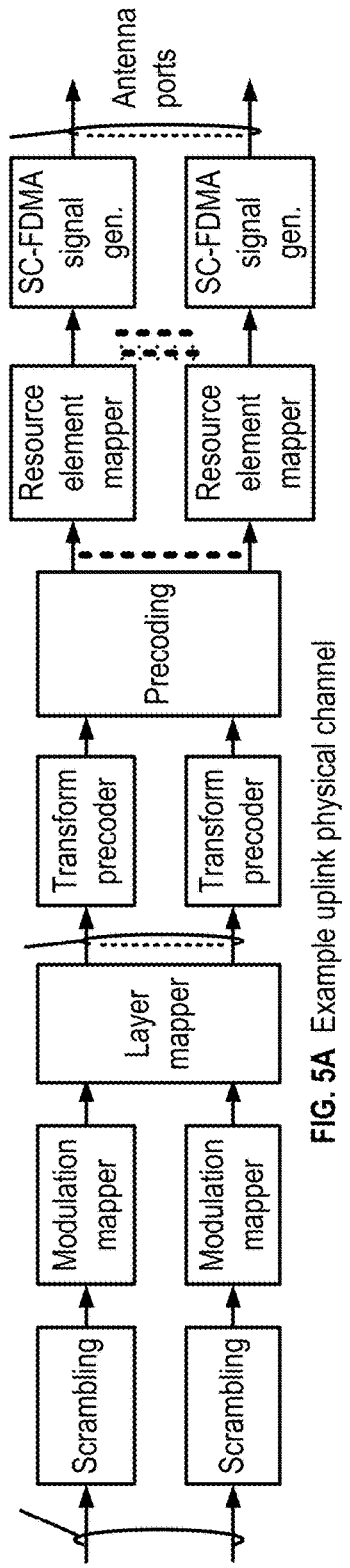
FIG. 5A Example uplink physical channel
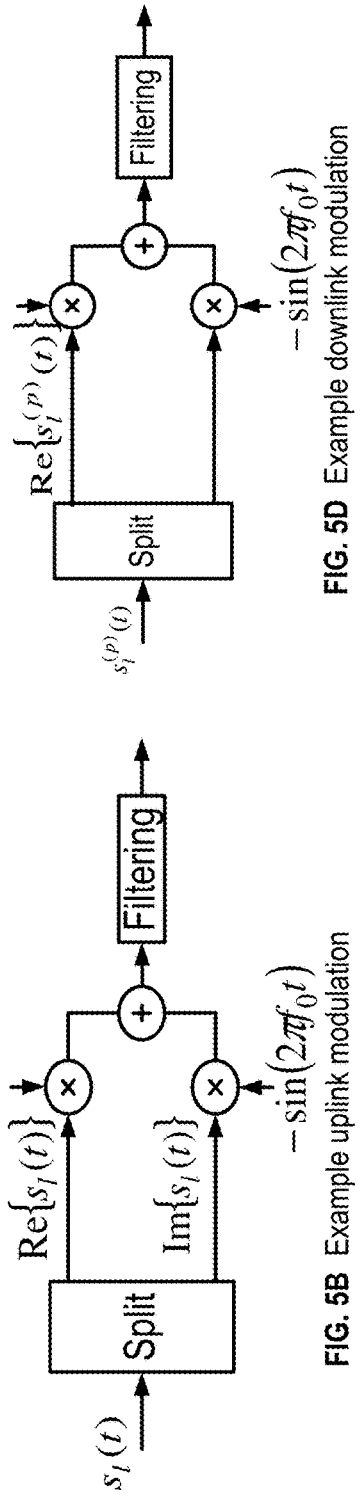
FIG. 5B Example uplink modulation
FIG. 5D Example downlink modulation
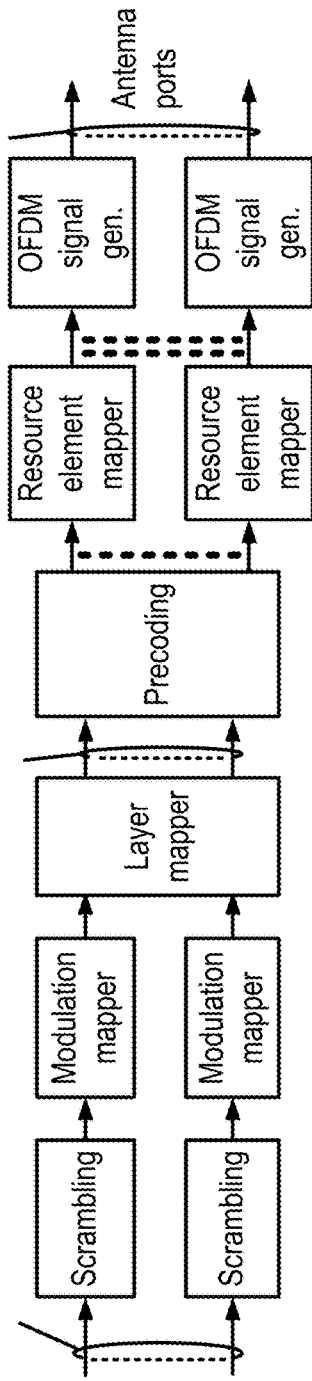
FIG. 5C Example downlink physical channel Dual-Connectivity at eNB Table 1: 4-bit CQI Table

| CQI index | Modulation | Code rate x 1024 | efficiency |
|---|---|---|---|
| 0 | out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

FIG. 14A

Table 2: 4-bit CQI Table

| CQI index | Modulation | Code rate x 1024 | efficiency |
|---|---|---|---|
| 0 | out of range | | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 12 | 256QAM | 711 | 5.5547 |
| 13 | 256QAM | 797 | 6.2266 |
| 14 | 256QAM | 885 | 6.9141 |
| 15 | 256QAM | 948 | 7.4063 |

FIG. 14B

CONTROL CHANNEL OF A SECONDARY CELL IN A TIMING ADVANCE GROUP

CROSS-REFERENCE TO RELATED APPLICATIONS

This application claims the benefit of U.S. Provisional Application No. 62/130,571, filed Mar. 9, 2016, and U.S. Provisional Application No. 62/133,944, filed Mar. 16, 2016 which are hereby incorporated by reference in their entirety.

BRIEF DESCRIPTION OF THE SEVERAL VIEWS OF THE DRAWINGS

Examples of several of the various embodiments of the present invention are described herein with reference to the drawings.

FIG. 5A, FIG. 5B, FIG. 5C and FIG. 5D are example diagrams for uplink and downlink signal transmission as per an aspect of an embodiment of the present invention.

FIGS. 14A and 14B are example CQI tables as per an aspect of an embodiment of the present invention.

DETAILED DESCRIPTION OF EMBODIMENTS

Figure 1:
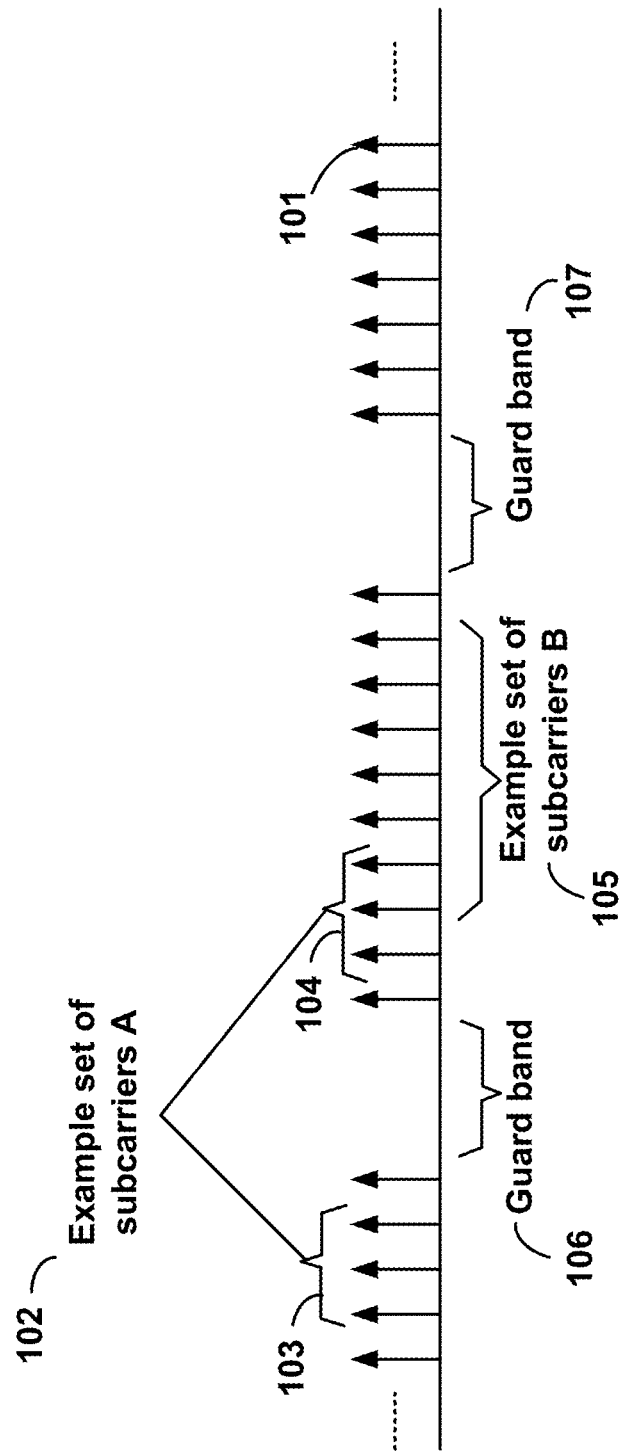
FIG. 1 is a diagram depicting example sets of OFDM subcarriers as per an aspect of an embodiment of the present invention.

Example embodiments of the present invention enable operation of multiple physical uplink control channel (PUCCH) groups. Embodiments of the technology disclosed herein may be employed in the technical field of multicarrier communication systems. More particularly, the embodiments of the technology disclosed herein may relate to operation of PUCCH groups.

The following Acronyms are used throughout the present disclosure:

ASIC application-specific integrated circuit
BPSK binary phase shift keying
CA carrier aggregation
CSI channel state information
CDMA code division multiple access
CSS common search space
CPLD complex programmable logic devices
CC component carrier
DL downlink
DCI downlink control information
DC dual connectivity
EPC evolved packet core
E-UTRAN evolved-universal terrestrial radio access network
FPGA field programmable gate arrays
FDD frequency division multiplexing
HDL hardware description languages
HARQ hybrid automatic repeat request
IE information element
LTE long term evolution
MCG master cell group
MeNB master evolved node B
MIB master information block
MAC media access control
MAC media access control
MME mobility management entity
NAS non-access stratum
OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCell primary cell
PCC primary component carrier
PSCell primary secondary cell pTAG primary timing advance group
QAM quadrature amplitude modulation
QPSK quadrature phase shift keying
RBG Resource Block Groups
RLC radio link control
RRC radio resource control
RA random access
RB resource blocks
SCC secondary component carrier
SCell secondary cell
Scell secondary cells
SCG secondary cell group
SeNB secondary evolved node B
sTAGs secondary timing advance group
SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance
TAG timing advance group
TB transport block
UL uplink
UE user equipment
VHDL VHSIC hardware description language Example embodiments of the invention may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
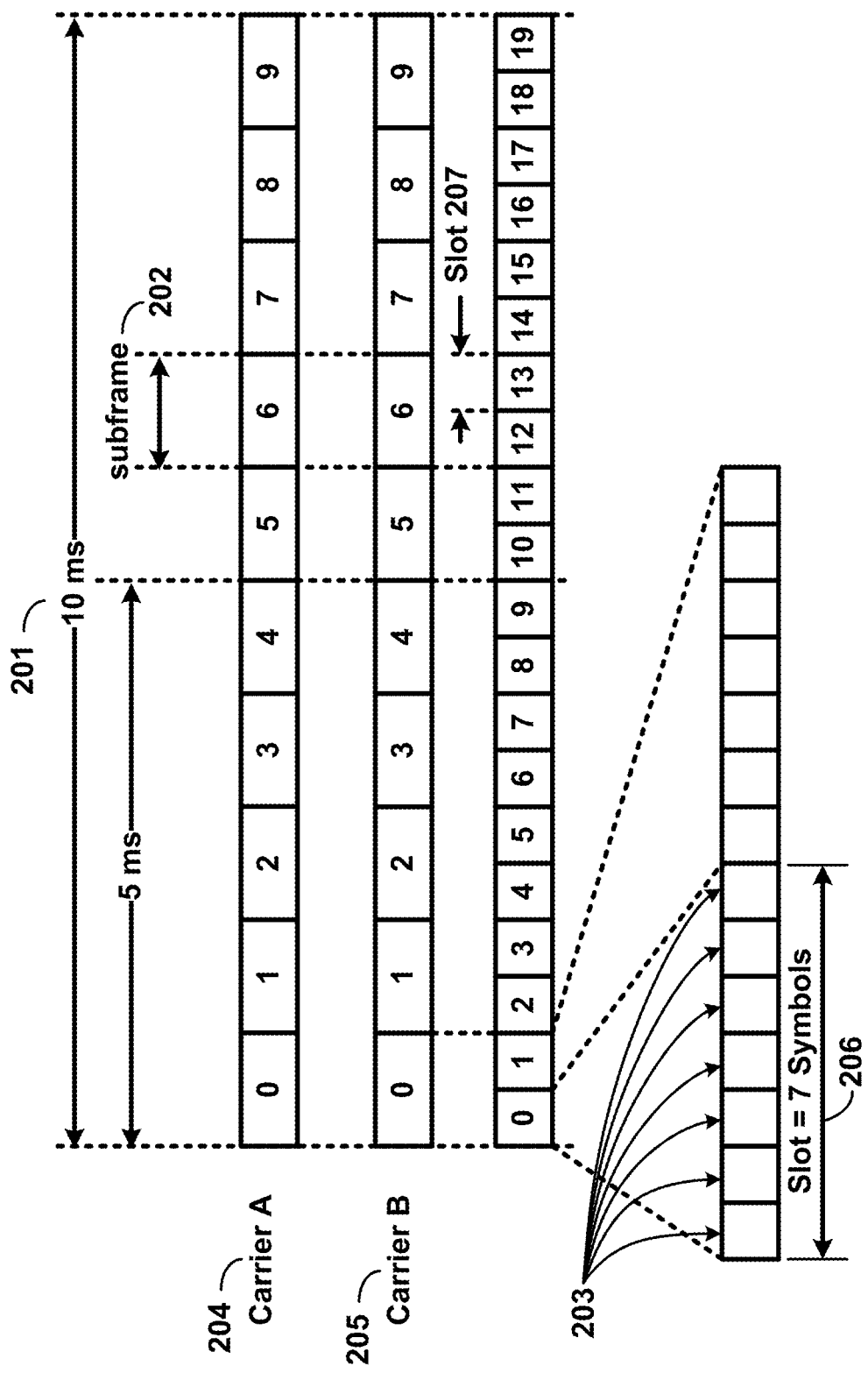
FIG. 2 is a diagram depicting an example transmission time and reception time for two carriers in a carrier group as per an aspect of an embodiment of the present invention.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized subframes 202. Other subframe durations such as including 0.5 msec, 1 msec, 2 msec, and 5 msec may also be supported. Subframe(s) may consist of two or more slots (e.g. slots 206 and 207). For the example of FDD, 10 subframes may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

Figure 3:
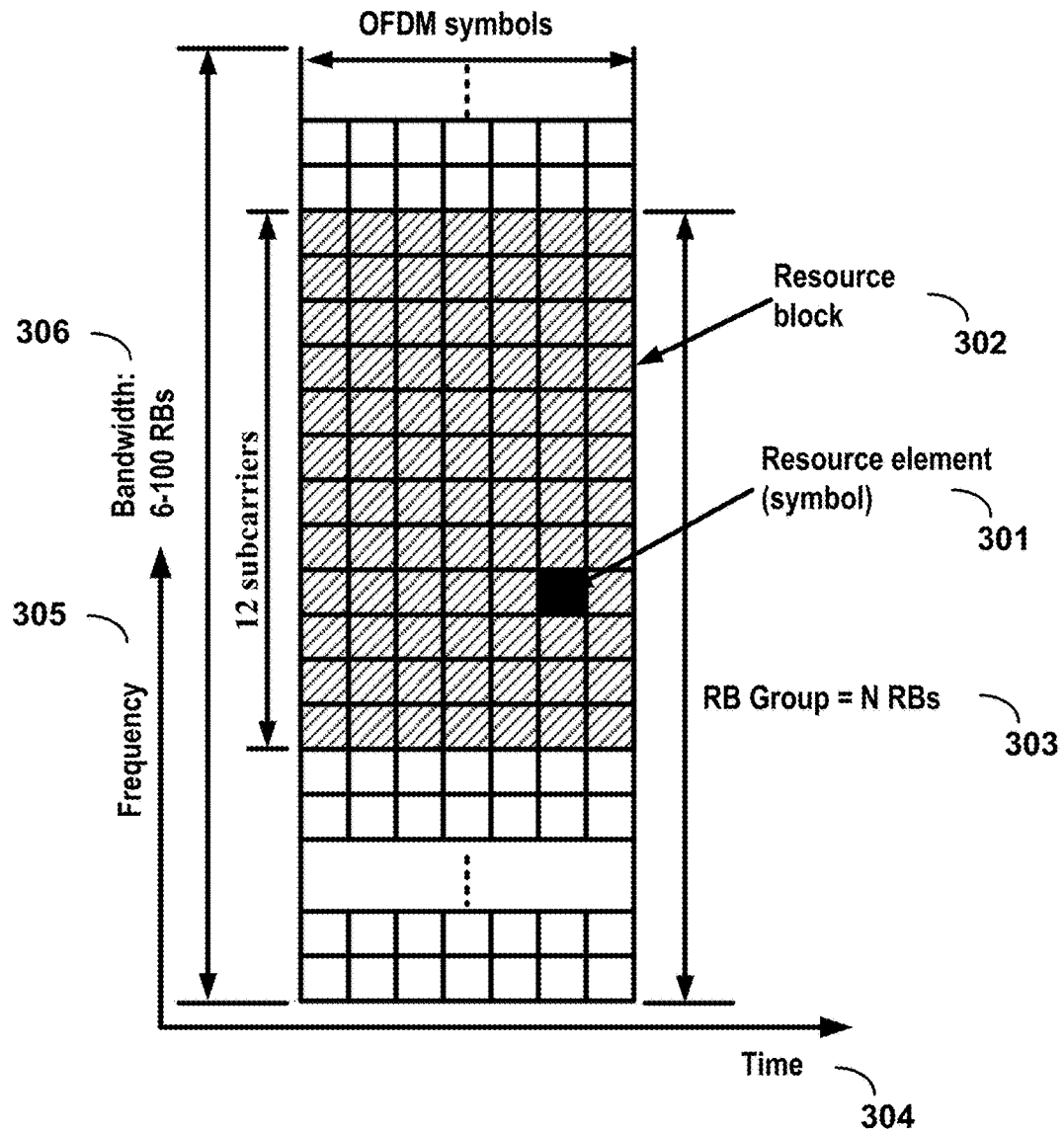
FIG. 3 is a diagram depicting OFDM radio resources as per an aspect of an embodiment of the present invention.

FIG. 3 is a diagram depicting OFDM radio resources as per an aspect of an embodiment of the present invention. The resource grid structure in time 304 and frequency 305 is illustrated in FIG. 3. The quantity of downlink subcarriers or RBs (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

FIG. 5A, FIG. 5B, FIG. 5C and FIG. 5D are example diagrams for uplink and downlink signal transmission as per an aspect of an embodiment of the present invention. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain SC-FDMA signal for each antenna port, and/or the like.

Example modulation and up-conversion to the carrier frequency of the complex-valued SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
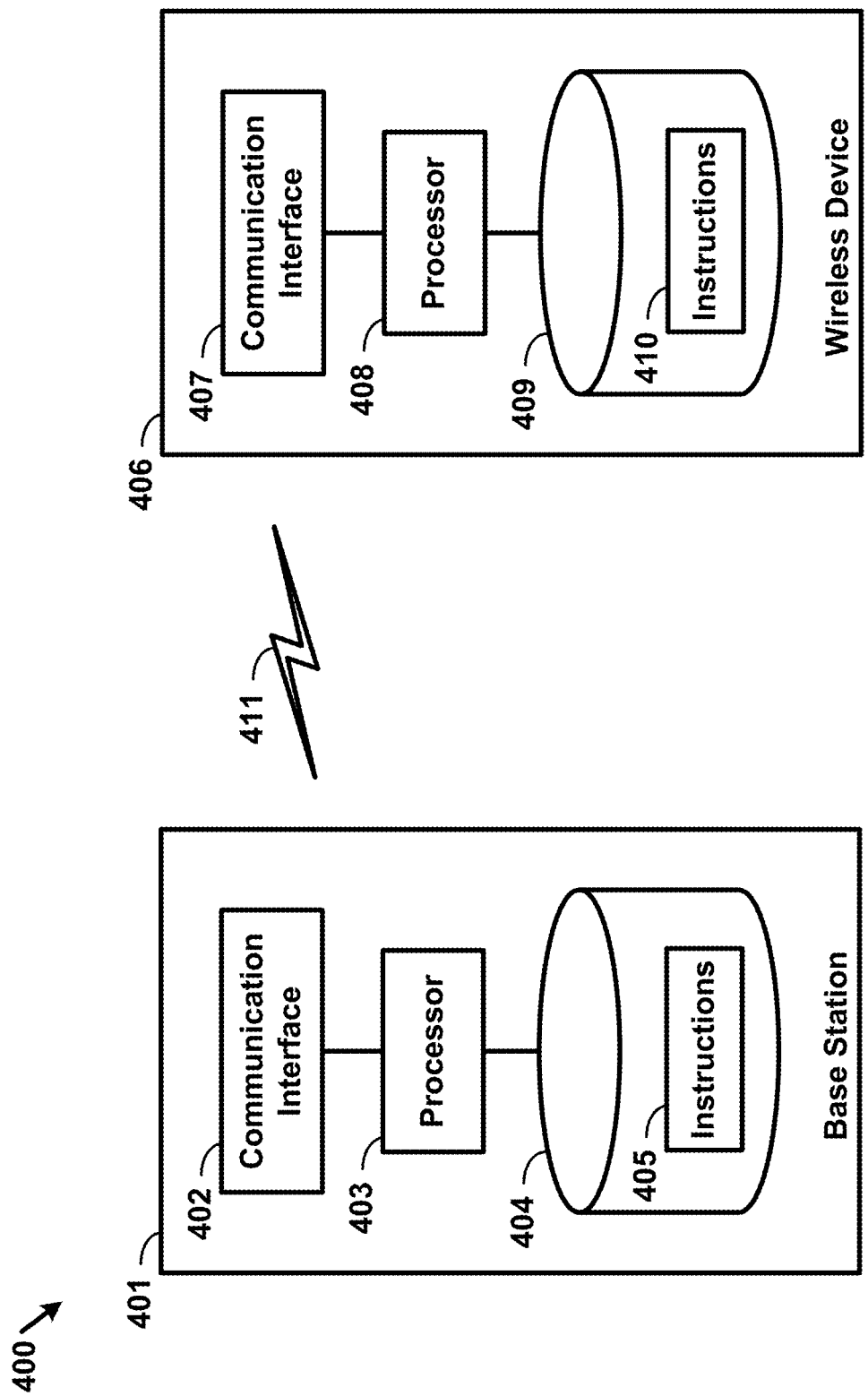
FIG. 4 is a block diagram of a base station and a wireless device as per an aspect of an embodiment of the present invention.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to some of the various aspects of embodiments, an LTE network may include a multitude of base stations, providing a user plane PDCP/RLC/MAC/PHY and control plane (RRC) protocol terminations towards the wireless device. The base station(s) may be interconnected with other base station(s) (e.g. employing an X2 interface). The base stations may also be connected employing, for example, an S1 interface to an EPC. For example, the base stations may be interconnected to the MME employing the S1-MME interface and to the S-G) employing the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply to, for example, carrier activation. When the specification indicates that a first carrier is activated, the specification may equally mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE technology.

Figure 6:
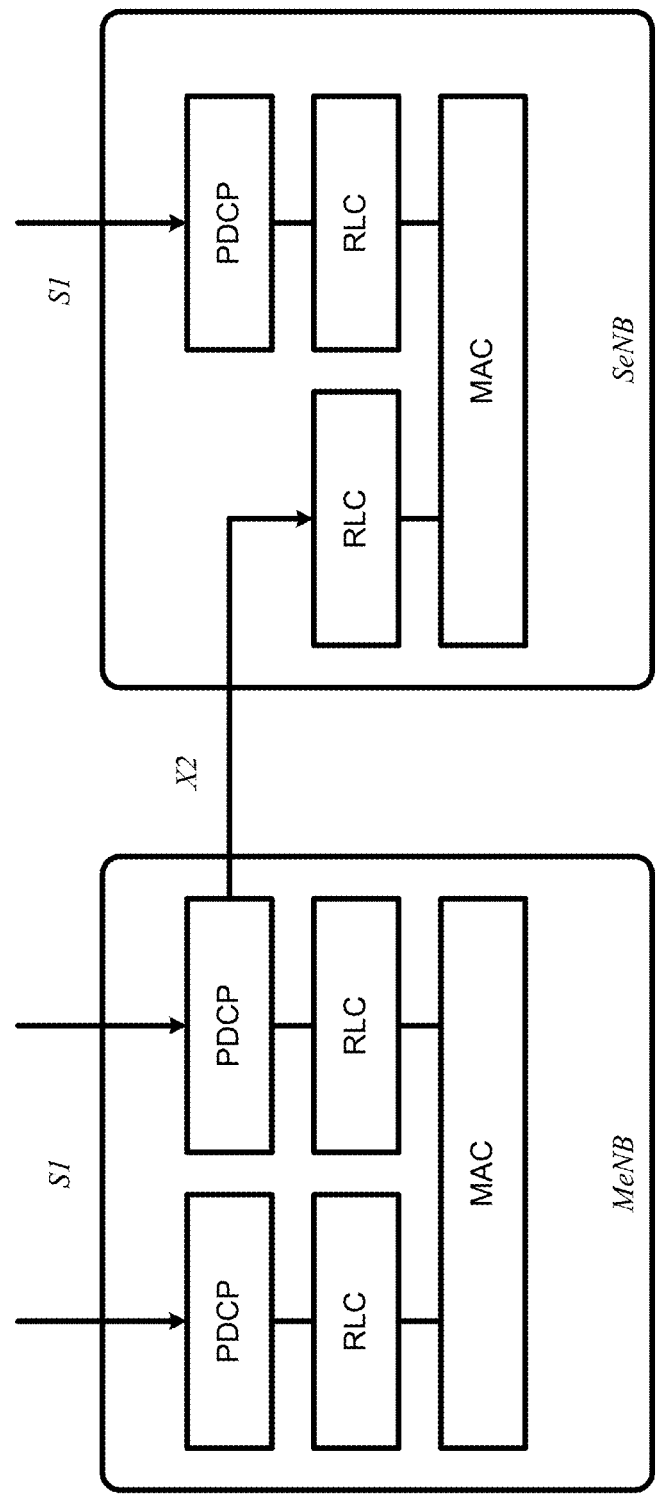
FIG. 6 is an example diagram for a protocol structure with CA and DC as per an aspect of an embodiment of the present invention.
Figure 7:
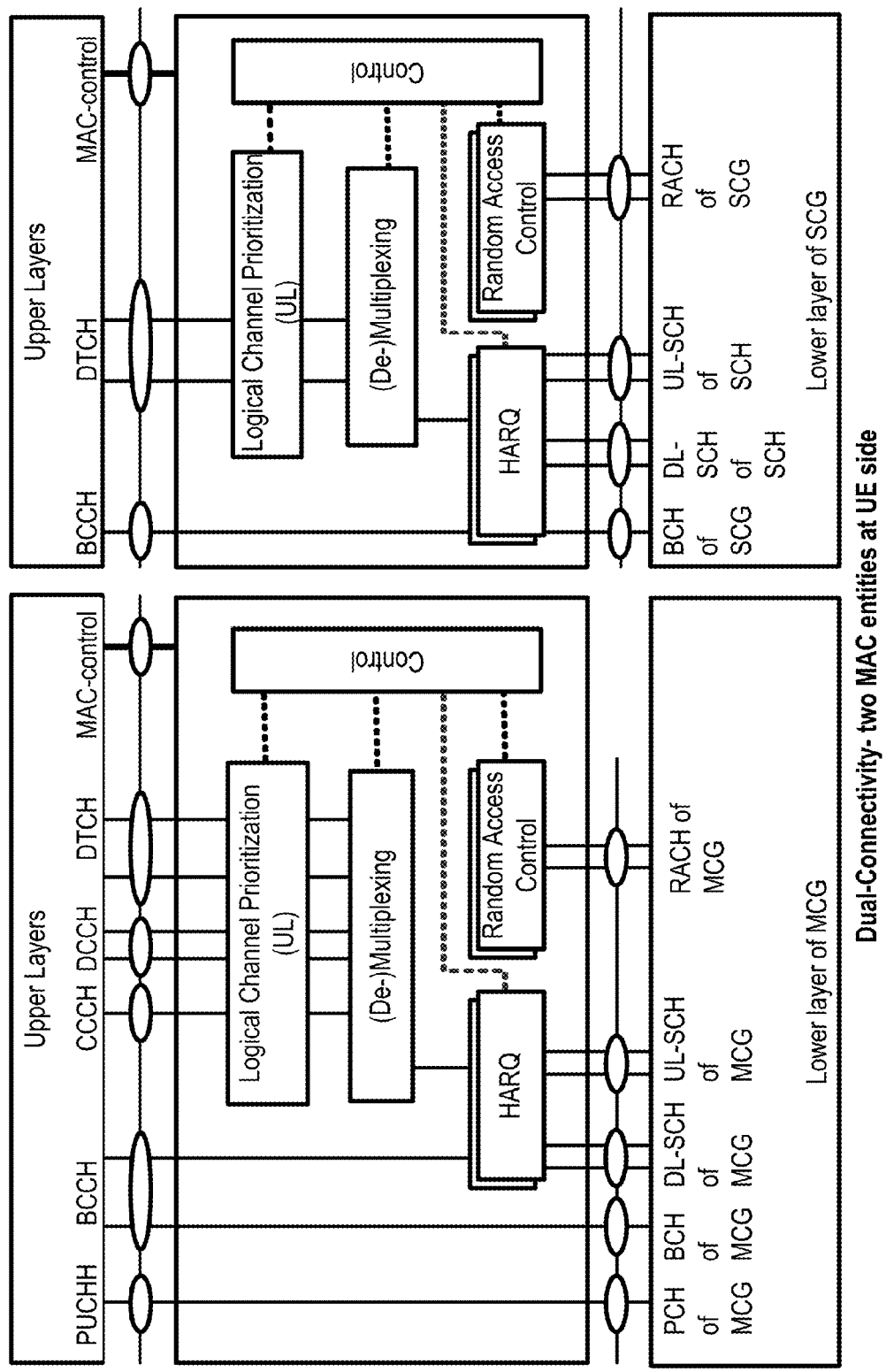
FIG. 7 is an example diagram for a protocol structure with CA and DC as per an aspect of an embodiment of the present invention.

FIG. 6 and FIG. 7 are example diagrams for protocol structure with CA and DC as per an aspect of an embodiment of the present invention. E-UTRAN may support Dual Connectivity (DC) operation whereby a multiple RX/TX UE in RRC_CONNECTED may be configured to utilize radio resources provided by two schedulers located in two eNBs connected via a non-ideal backhaul over the X2 interface. eNBs involved in DC for a certain UE may assume two different roles: an eNB may either act as an MeNB or as an SeNB. In DC a UE may be connected to one MeNB and one SeNB. Mechanisms implemented in DC may be extended to cover more than two eNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In DC, the radio protocol architecture that a particular bearer uses may depend on how the bearer is setup. Three alternatives may exist, an MCG bearer, an SCG bearer and a split bearer as shown in FIG. 6. RRC may be located in MeNB and SRBs may be configured as a MCG bearer type and may use the radio resources of the MeNB. DC may also be described as having at least one bearer configured to use radio resources provided by the SeNB. DC may or may not be configured/implemented in example embodiments of the invention.

In the case of DC, the UE may be configured with two MAC entities: one MAC entity for MeNB, and one MAC entity for SeNB. In DC, the configured set of serving cells for a UE may comprise of two subsets: the Master Cell Group (MCG) containing the serving cells of the MeNB, and the Secondary Cell Group (SCG) containing the serving cells of the SeNB. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one Split bearer; upon detection of a physical layer problem or a random access problem on a PSCell, or the maximum number of RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a MeNB may be informed by the UE of a SCG failure type, for split bearer, the DL data transfer over the MeNB is maintained; the RLC AM bearer may be configured for the split bearer; like PCell, PSCell may not be de-activated; PSCell may be changed with a SCG change (e.g. with security key change and a RACH procedure); and/or neither a direct bearer type change between a Split bearer and a SCG bearer nor simultaneous configuration of a SCG and a Split bearer are supported.

With respect to the interaction between a MeNB and a SeNB, one or more of the following principles may be applied: the MeNB may maintain the RRM measurement configuration of the UE and may, (e.g, based on received measurement reports or traffic conditions or bearer types), decide to ask a SeNB to provide additional resources (serving cells) for a UE; upon receiving a request from the MeNB, a SeNB may create a container that may result in the configuration of additional serving cells for the UE (or decide that it has no resource available to do so); for UE capability coordination, the MeNB may provide (part of) the AS configuration and the UE capabilities to the SeNB; the MeNB and the SeNB may exchange information about a UE configuration by employing of RRC containers (inter-node messages) carried in X2 messages; the SeNB may initiate a reconfiguration of its existing serving cells (e.g., PUCCH towards the SeNB); the SeNB may decide which cell is the PSCell within the SCG; the MeNB may not change the content of the RRC configuration provided by the SeNB; in the case of a SCG addition and a SCG SCell addition, the MeNB may provide the latest measurement results for the SCG cell(s); both a MeNB and a SeNB may know the SFN and subframe offset of each other by OAM, (e.g., for the purpose of DRX alignment and identification of a measurement gap). In an example, when adding a new SCG SCell, dedicated RRC signalling may be used for sending required system information of the cell as for CA, except for the SFN acquired from a MIB of the PSCell of a SCG.

According to some of the various aspects of embodiments, serving cells having an uplink to which the same time alignment (TA) applies may be grouped in a TA group (TAG). Serving cells in one TAG may use the same timing reference. For a given TAG, user equipment (UE) may use one downlink carrier as a timing reference at a given time. The UE may use a downlink carrier in a TAG as a timing reference for that TAG. For a given TAG, a UE may synchronize uplink subframe and frame transmission timing of uplink carriers belonging to the same TAG. According to some of the various aspects of embodiments, serving cells having an uplink to which the same TA applies may correspond to serving cells hosted by the same receiver. A TA group may comprise at least one serving cell with a configured uplink. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). Carriers within the same TA group may use the same TA value and the same timing reference. When DC is configured, cells belonging to a cell group (MCG or SCG) may be grouped into multiple TAGs including a pTAG and one or more sTAGs.

Figure 8:
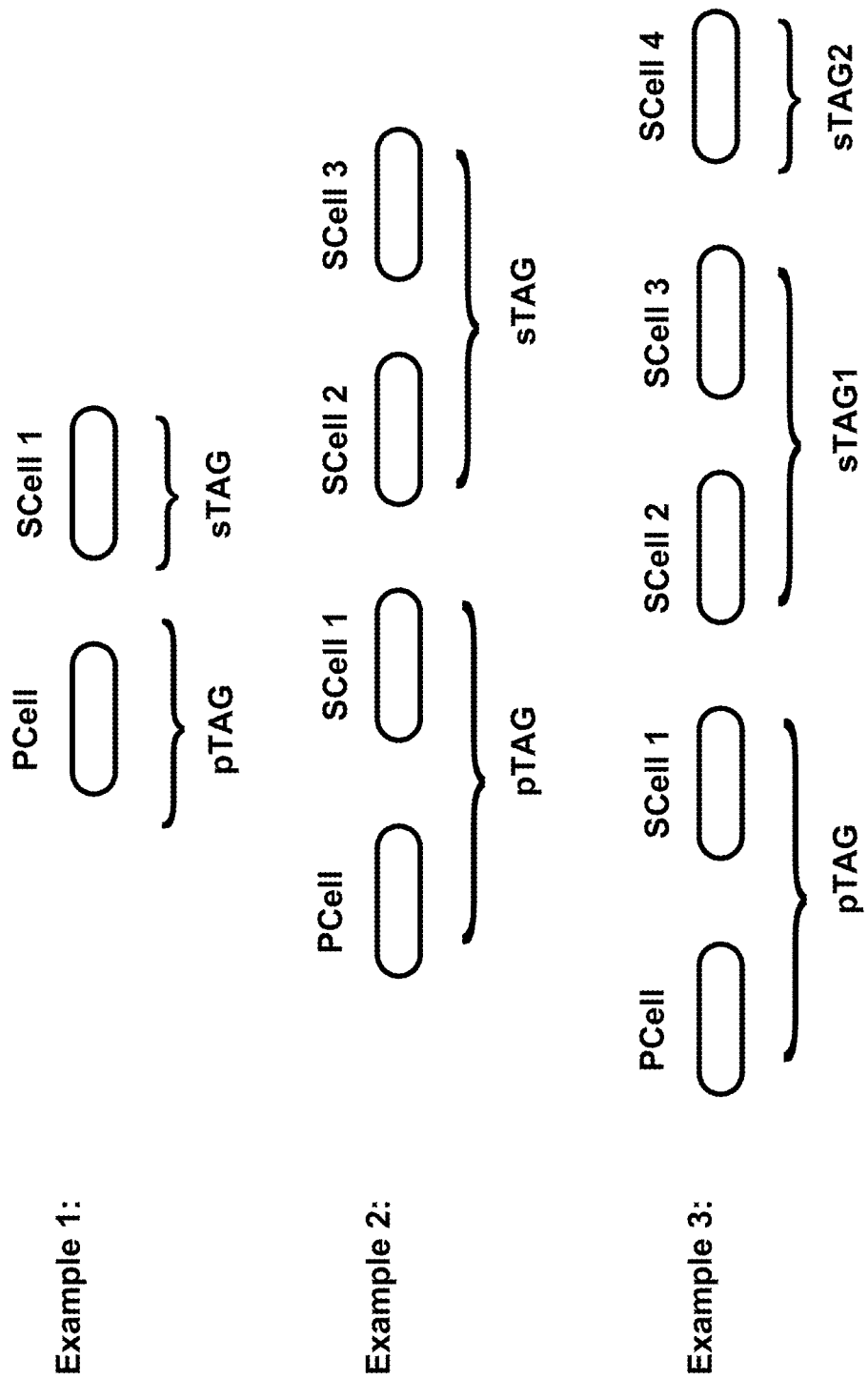
FIG. 8 shows example TAG configurations as per an aspect of an embodiment of the present invention.

FIG. 8 shows example TAG configurations as per an aspect of an embodiment of the present invention. In Example 1, pTAG comprises PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. The operation with one example sTAG is described, and the same operation may be applicable to other sTAGs. The example mechanisms may be applied to configurations with multiple sTAGs.

According to some of the various aspects of embodiments, TA maintenance, pathloss reference handling and a timing reference for a pTAG may follow LTE release 10 principles in the MCG and/or SCG. The UE may need to measure downlink pathloss to calculate uplink transmit power. A pathloss reference may be used for uplink power control and/or transmission of random access preamble(s). UE may measure downlink pathloss using signals received on a pathloss reference cell. For SCell(s) in a pTAG, the choice of a pathloss reference for cells may be selected from and/or be limited to the following two options: a) the downlink SCell linked to an uplink SCell using system information block 2 (SIB2), and b) the downlink pCell. The pathloss reference for SCells in a pTAG may be configurable using RRC message(s) as a part of an SCell initial configuration and/or reconfiguration. According to some of the various aspects of embodiments, a PhysicalConfigDedicatedSCell information element (IE) of an SCell configuration may include a pathloss reference SCell (downlink carrier) for an SCell in a pTAG. The downlink SCell linked to an uplink SCell using system information block 2 (SIB2) may be referred to as the SIB2 linked downlink of the SCell. Different TAGs may operate in different bands. For an uplink carrier in an sTAG, the pathloss reference may be only configurable to the downlink SCell linked to an uplink SCell using the system information block 2 (SIB2) of the SCell.

To obtain initial uplink (UL) time alignment for an sTAG, an eNB may initiate an RA procedure. In an sTAG, a UE may use one of any activated SCells from this sTAG as a timing reference cell. In an example embodiment, the timing reference for SCells in an sTAG may be the SIB2 linked downlink of the SCell on which the preamble for the latest RA procedure was sent. There may be one timing reference and one time alignment timer (TAT) per TA group. A TAT for TAGs may be configured with different values. In a MAC entity, when a TAT associated with a pTAG expires: all TATs may be considered as expired, the UE may flush HARQ buffers of serving cells, the UE may clear any configured downlink assignment/uplink grants, and the RRC in the UE may release PUCCH/SRS for all configured serving cells. When the pTAG TAT is not running, an sTAG TAT may not be running. When the TAT associated with an sTAG expires: a) SRS transmissions may be stopped on the corresponding SCells, b) SRS RRC configuration may be released, c) CSI reporting configuration for corresponding SCells may be maintained, and/or d) the MAC in the UE may flush the uplink HARQ buffers of the corresponding SCells.

An eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
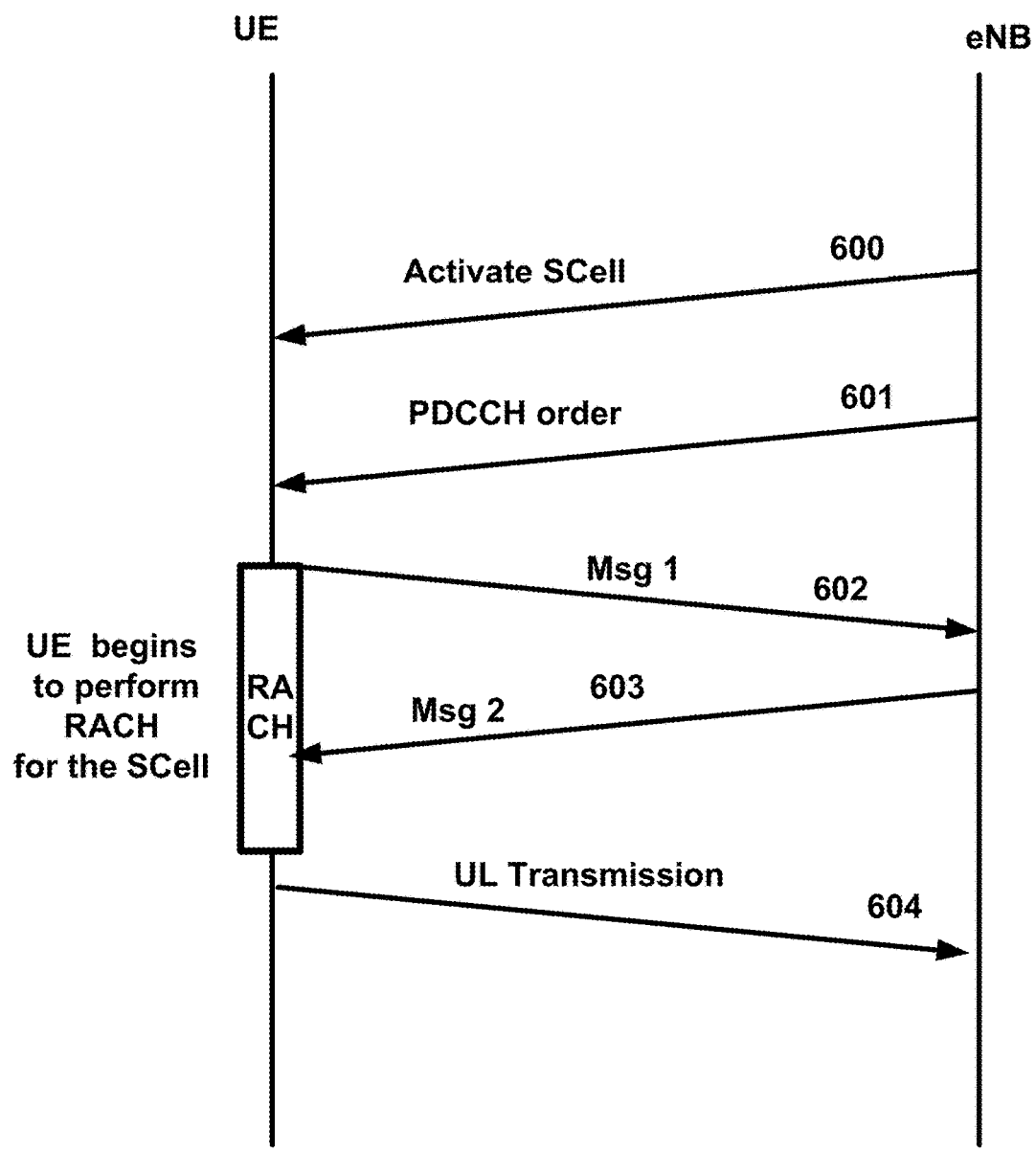
FIG. 9 is an example message flow in a random access process in a secondary TAG as per an aspect of an embodiment of the present invention.

FIG. 9 is an example message flow in a random access process in a secondary TAG as per an aspect of an embodiment of the present invention. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to some of the various aspects of embodiments, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to some of the various aspects of embodiments, when an eNB performs an SCell addition configuration, the related TAG configuration may be configured for the SCell. In an example embodiment, an eNB may modify the TAG configuration of an SCell by removing (releasing) the SCell and adding(configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, for example, at least one RRC reconfiguration message, may be send to the UE to reconfigure TAG configurations by releasing the SCell and then configuring the SCell as a part of the pTAG (when an SCell is added/configured without a TAG index, the SCell may be explicitly assigned to the pTAG). The PCell may not change its TA group and may always be a member of the pTAG.

The purpose of an RRC connection reconfiguration procedure may be to modify an RRC connection, (e.g. to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH is only transmitted on the PCell (PSCell) to an eNB. In LTE-Release 12 and earlier, a UE may transmit PUCCH information on one cell (PCell or PSCell) to a given eNB.

Figure 10:
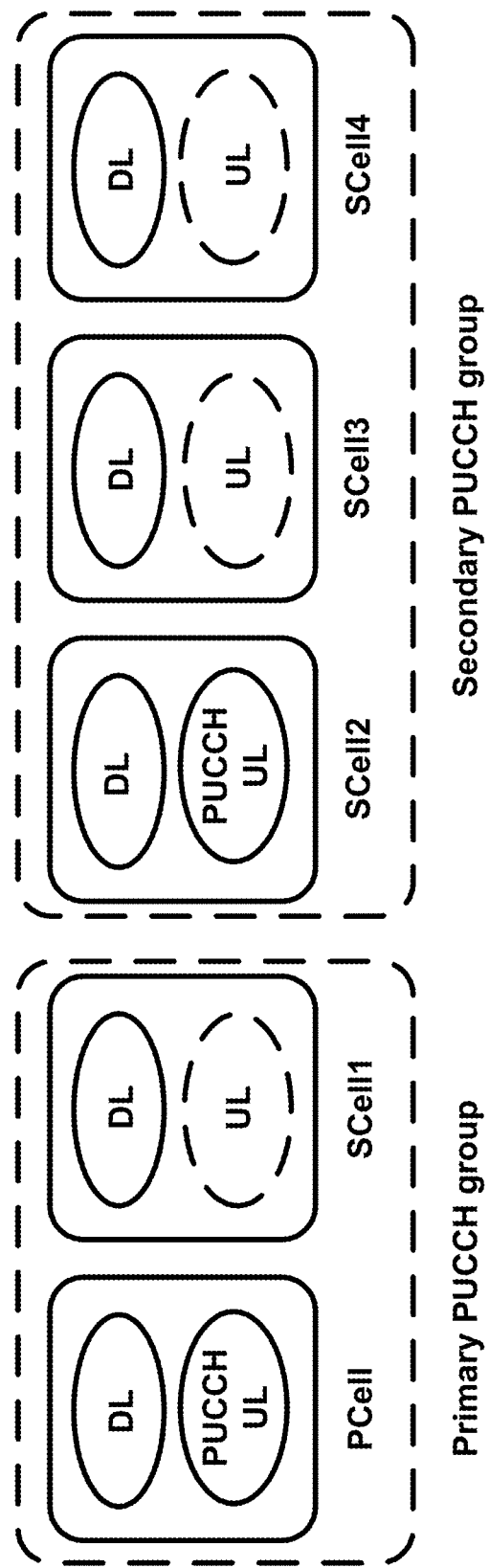
FIG. 10 is an example grouping of cells into PUCCH groups as per an aspect of an embodiment of the present invention.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. FIG. 10 is an example grouping of cells into PUCCH groups as per an aspect of an embodiment of the present invention. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In Release-12, a PUCCH can be configured on a PCell and/or a PSCell, but cannot be configured on other SCells. In an example embodiment, a UE may transmit a message indicating that the UE supports PUCCH configuration on a PCell and SCell. Such an indication may be separate from an indication of of dual connectivity support by the UE. In an example embodiment, a UE may support both DC and PUCCH groups. In an example embodiment, either DC or PUCCH groups may be configured, but not both. In another example embodiment, more complicated configurations comprising both DC and PUCCH groups may be supported.

When a UE is capable of configuring PUCCH groups, and if a UE indicates that it supports simultaneous PUCCH/PUSCH transmission capability, it may imply that the UE supports simultaneous PUCCH/PUSCH transmission on both PCell and SCell. When multiple PUCCH groups are configured, a PUCCH may be configured or not configured with simultaneous PUCCH/PUSCH transmission.

In an example embodiment, PUCCH transmission to a base station on two serving cells may be realized as shown in FIG. 10. A first group of cells may employ a PUCCH on the PCell and may be called PUCCH group 1 or a primary PUCCH group. A second group of cells may employ a PUCCH on an SCell and may be called PUCCH group 2 or a secondary PUCCH group. One, two or more PUCCH groups may be configured. In an example, cells may be grouped into two PUCCH groups, and each PUCCH group may include a cell with PUCCH resources. A PCell may provide PUCCH resources for the primary PUCCH group and an SCell in the secondary PUCCH group may provide PUCCH resources for the cells in the secondary PUCCH group. In an example embodiment, no cross-carrier scheduling between cells in different PUCCH groups may be configured. When cross-carrier scheduling between cells in different PUCCH groups is not configured, ACK/NACK on PHICH channel may be limited within a PUCCH group. Both downlink and uplink scheduling activity may be separate between cells belonging to different PUCCH groups.

A PUCCH on an SCell may carry HARQ-ACK and CSI information. A PCell may be configured with PUCCH resources. In an example embodiment, RRC parameters for an SCell PUCCH Power Control for a PUCCH on an SCell may be different from those of a PCell PUCCH. A Transmit Power Control command for a PUCCH on an SCell may be transmitted in DCI(s) on the SCell carrying the PUCCH.

UE procedures on a PUCCH transmission may be different and/or independent between PUCCH groups. For example, determination of DL HARQ-ACK timing, PUCCH resource determination for HARQ-ACK and/or CSI, Higher-layer configuration of simultaneous HARQ-ACK+CSI on a PUCCH, Higher-layer configuration of simultaneous HARQ-ACK+SRS in one subframe may be configured differently for a PUCCH PCell and a PUCCH SCell.

A PUCCH group may be a group of serving cells configured by a RRC and use the same serving cell in the group for transmission of a PUCCH. A Primary PUCCH group may be a PUCCH group containing a PCell. A secondary PUCCH group may be a PUCCH cell group not containing the PCell. In an example embodiment, an SCell may belong to one PUCCH group. When one SCell belongs to a PUCCH group, ACK/NACK or CSI for that SCell may be transmitted over the PUCCH in that PUCCH group (over PUCCH SCell or PUCCH PCell). A PUCCH on an SCell may reduce the PUCCH load on the PCell. A PUCCH SCell may be employed for UCI transmission of SCells in the corresponding PUCCH group.

In an example embodiment, a flexible PUCCH configuration in which control signalling is sent on one, two or more PUCCHs may be possible. Beside the PCell, it may be possible to configure a selected number of SCells for PUCCH transmission (herein called PUCCH SCells). Control signalling information conveyed in a certain PUCCH SCell may be related to a set of SCells in a corresponding PUCCH group that are configured by the network via RRC signalling.

PUCCH control signalling carried by a PUCCH channel may be distributed between a PCell and SCells for offloading or robustness purposes. By enabling a PUCCH in an SCell, it may be possible to distribute the overall CSI reports for a given UE between a PCell and a selected number of SCells (e.g. PUCCH SCells), thereby limiting PUCCH CSI resource consumption by a given UE on a certain cell. It may be possible to map CSI reports for a certain SCell to a selected PUCCH SCell. An SCell may be assigned a certain periodicity and time-offset for transmission of control information. Periodic CSI for a serving cell may be mapped on a PUCCH (on the PCell or on a PUCCH-SCell) via RRC signalling. The possibility of distributing CSI reports, HARQ feedbacks, and/or Scheduling Requests across PUCCH SCells may provide flexibility and capacity improvements. HARQ feedback for a serving cell may be mapped on a PUCCH (on the PCell or on a PUCCH SCell) via RRC signalling.

In example embodiments, PUCCH transmission may be configured on a PCell, as well as one SCell in CA. An SCell PUCCH may be realized using the concept of PUCCH groups, where aggregated cells are grouped into two or more PUCCH groups. One cell from a PUCCH group may be configured to carry a PUCCH. More than 5 carriers may be configured. In the example embodiments, up to n carriers may be aggregated. For example, n may be 16, 32, or 64. Some CCs may have non-backward compatible configurations supporting only advanced UEs (e.g. support licensed assisted access SCells). In an example embodiment, one SCell PUCCH (e.g. two PUCCH groups) may be supported.

In another example embodiment, a PUCCH group concept with multiple (more than one) SCells carrying PUCCH may be employed (e.g., there can be more than two PUCCH groups).

In an example embodiment, a given PUCCH group may not comprise serving cells of both MCG and SCG. One of the PUCCHs may be configured on the PCell. In an example embodiment, PUCCH mapping of serving cells may be configured by RRC messages. In an example embodiment, a maximum value of an SCellIndex and a ServCellIndex may be 31 (ranging from 0 to 31). In an example, a maximum value of stag-Id may be 3. The CIF for a scheduled cell may be configured explicitly. A PUCCH SCell may be configured by giving a PUCCH configuration for an SCell. A HARQ feedback and CSI report of a PUCCH SCell may be sent on the PUCCH of that PUCCH SCell. The HARQ feedback and CSI report of a SCell may sent on a PUCCH of a PCell if no PUCCH SCell is signalled for that SCell. The HARQ feedback and CSI report of an SCell may be sent on the PUCCH of one PUCCH SCell; hence they may not be sent on the PUCCH of different PUCCH SCell. The UE may report a Type 2 PH for serving cells configured with a PUCCH. In an example embodiment, a MAC activation/deactivation may be supported for a PUCCH SCell. An eNB may manage the activation/deactivation status for SCells. A newly added PUCCH SCell may be initially deactivated.

Figure 11:
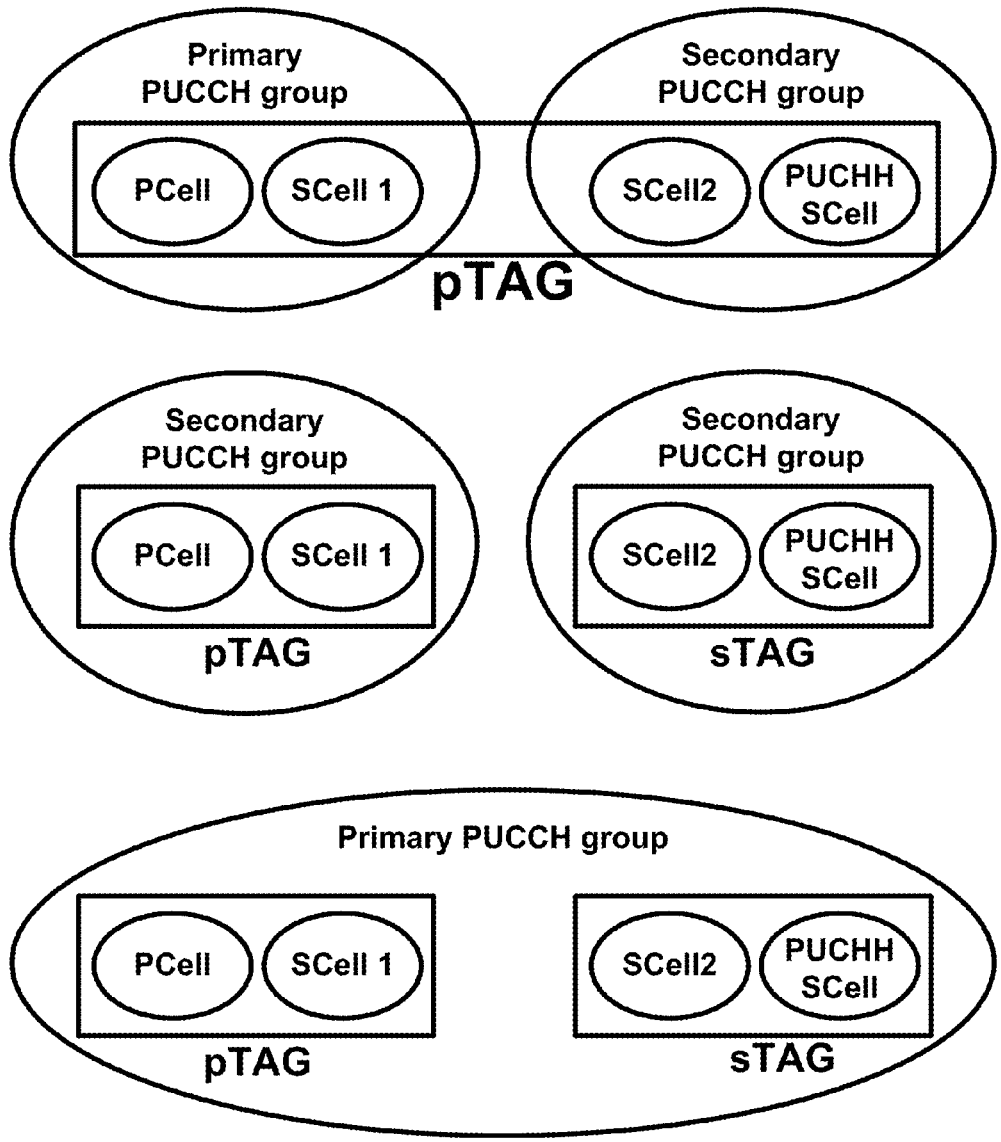
FIG. 11 illustrates example groupings of cells into one or more PUCCH groups and one or more TAGs as per an aspect of an embodiment of the present invention.
Figure 12:
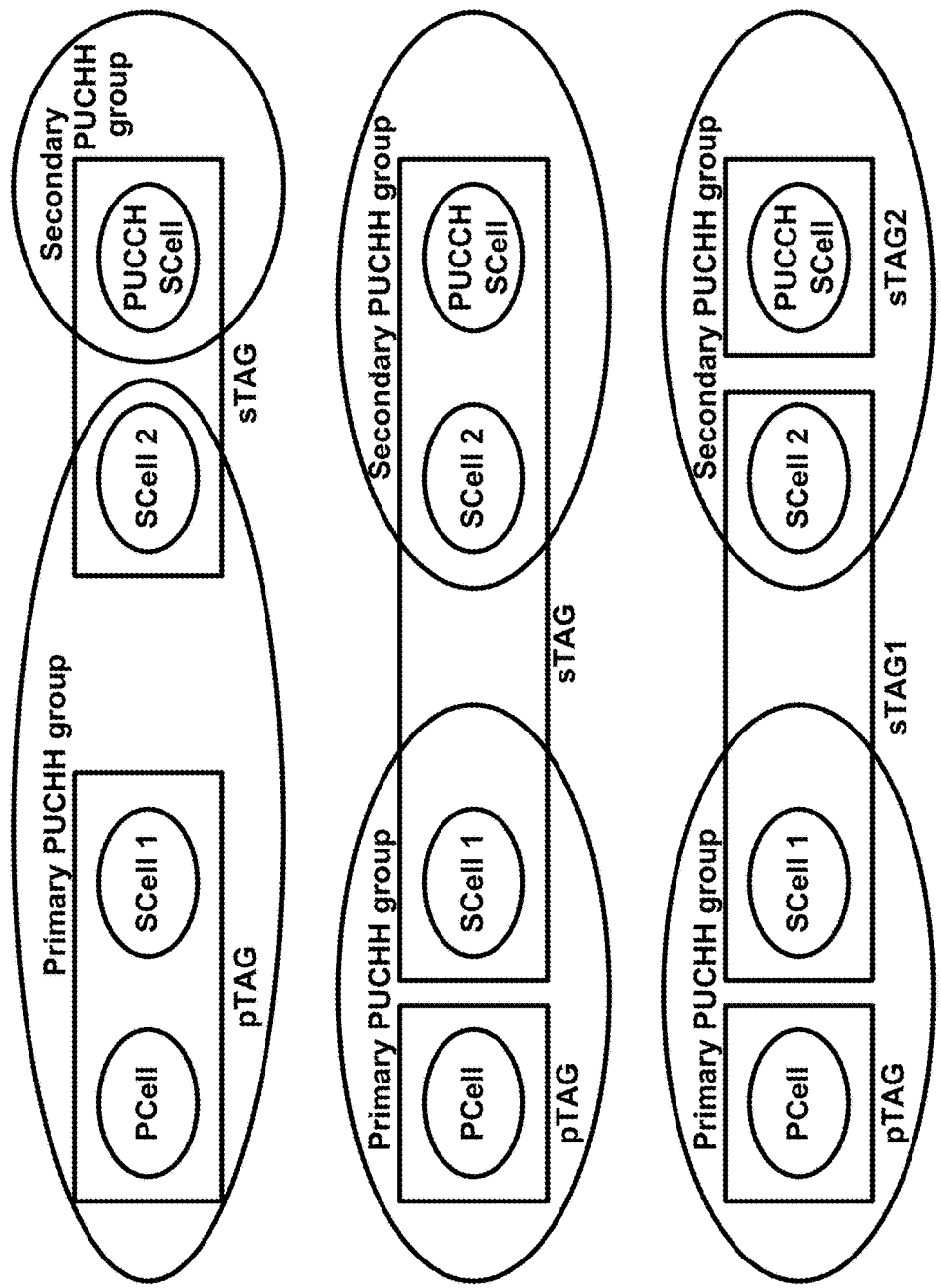
FIG. 12 illustrates example groupings of cells into one or more PUCCH groups and one or more TAGs as per an aspect of an embodiment of the present invention.

In an example embodiment, independent configuration of PUCCH groups and TAGs may be supported. FIG. 11 and FIG. 12 show example configurations of TAGs and PUCCH groups. For example, one TAG may contain multiple serving cells with a PUCCH. For example, each TAG may only comprise cells of one PUCCH group. For example, a TAG may comprise the serving cells (without a PUCCH) which belong to different PUCCH groups.

There may not be a one-to-one mapping between TAGs and PUCCH groups. For example, in a configuration, a PUCCH SCell may belong to primary TAG. In an example implementation, the serving cells of one PUCCH group may be in different TAGs and serving cells of one TAG may be in different PUCCH groups. Configuration of PUCCH groups and TAGs may be left to eNB implementation. In another example implementation, restriction(s) on the configuration of a PUCCH cell may be specified. For example, in an example embodiment, cells in a given PUCCH group may belong to the same TAG. In an example, an sTAG may only comprise cells of one PUCCH group. In an example, one-to-one mapping between TAGs and PUCCH groups may be implemented. In implementation, cell configurations may be limited to some of the examples. In other implementations, some or all the below configurations may be allowed.

In an example embodiment, for an SCell in a pTAG, the timing reference may be a PCell. For an SCell in an sTAG, the timing reference may be any activated SCell in the sTAG. For an SCell (configured with PUCCH or not) in a pTAG, a pathloss reference may be configured to be a PCell or an SIB-2 linked SCell. For an SCell in a sTAG, the pathloss reference may be the SIB-2 linked SCell. When a TAT associated with a pTAG is expired, the TAT associated with sTAGs may be considered as expired. When a TAT of an sTAG containing PUCCH SCell expires, the MAC may indicate to an RRC to release PUCCH resource for the PUCCH group. When the TAT of an sTAG containing a PUCCH SCell is not running, the uplink transmission (PUSCH) for SCells in the secondary PUCCH group not belonging to the sTAG including the PUCCH SCell may not be impacted. The TAT expiry of an sTAG containing a PUCCH SCell may not trigger TAT expiry of other TAGs to which other SCells in the same PUCCH group belong. When the TAT associated with sTAG not containing a PUCCH SCell is not running, the wireless device may stop the uplink transmission for the SCell in the sTAG and may not impact other TAGs.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command Example embodiments of the invention may enable operation of multiple PUCCH groups. Other example embodiments may comprise a non-transitory tangible computer readable media comprising instructions executable by one or more processors to cause operation of PUCCH groups. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of PUCCH groups. The device may include processors, memory, interfaces, and/or the like. Other example embodiments may comprise communication networks comprising devices such as base stations, wireless devices (or user equipment: UE), servers, switches, antennas, and/or the like. In an example embodiment one or more TAGs may be configured along with PUCCH group configuration.

Figure 13:
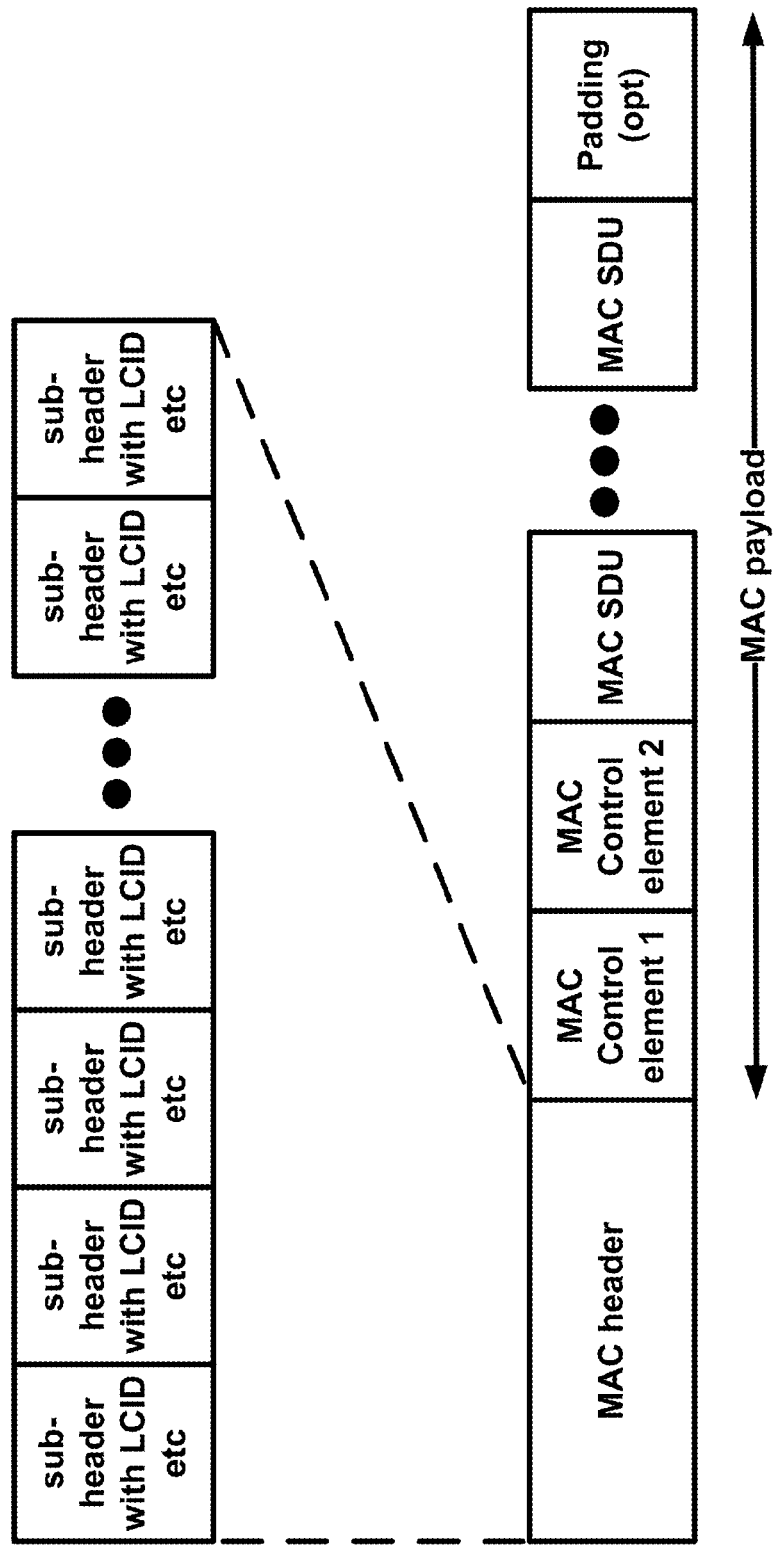
FIG. 13 is an example MAC PDU as per an aspect of an embodiment of the present invention.

FIG. 13 is an example MAC PDU as per an aspect of an embodiment of the present invention. In an example embodiment, a MAC PDU may comprise of a MAC header, zero or more MAC Service Data Units (MAC SDU), zero or more MAC control elements, and optionally padding. The MAC header and the MAC SDUs may be of variable sizes. A MAC PDU header may comprise one or more MAC PDU subheaders. A subheader may correspond to either a MAC SDU, a MAC control element or padding. A MAC PDU subheader may comprise header fields R, F2, E, LCID, F, and/or L. The last subheader in the MAC PDU and subheaders for fixed sized MAC control elements may comprise the four header fields R, F2, E, and/or LCID. A MAC PDU subheader corresponding to padding may comprise the four header fields R, F2, E, and/or LCID.

In an example embodiment, LCID or Logical Channel ID field may identify the logical channel instance of the corresponding MAC SDU or the type of the corresponding MAC control element or padding. There may be one LCID field for a MAC SDU, MAC control element or padding included in the MAC PDU. In addition to that, one or two additional LCID fields may be included in the MAC PDU when single-byte or two-byte padding is required but cannot be achieved by padding at the end of the MAC PDU. The LCID field size may be, e.g. 5 bits. L or the Length field may indicate the length of the corresponding MAC SDU or variable-sized MAC control element in bytes. There may be one L field per MAC PDU subheader except for the last subheader and subheaders corresponding to fixed-sized MAC control elements. The size of the L field may be indicated by the F field and F2 field. The F or the Format field may indicate the size of the Length field. There may be one F field per MAC PDU subheader except for the last subheader and subheaders corresponding to fixed-sized MAC control elements and expect for when F2 is set to 1. The size of the F field may be 1 bit. In an example, if the F field is included, and/or if the size of the MAC SDU or variable-sized MAC control element is less than 128 bytes, the value of the F field is set to 0, otherwise it is set to 1. The F2 or the Format2 field may indicate the size of the Length field. There may be one F2 field per MAC PDU subheader. The size of the F2 field may be 1 bit. In an example, if the size of the MAC SDU or variable-sized MAC control element is larger than 32767 bytes and if the corresponding subheader is not the last subheader, the value of the F2 field may be set to 1, otherwise it is set to 0. The E or the Extension field may be a flag indicating if more fields are present in the MAC header or not. The E field may be set to "1" to indicate another set of at least R/F2/E/LCID fields. The E field may be set to "0" to indicate that either a MAC SDU, a MAC control element or padding starts at the next byte. R or reserved bit, set to "0".

MAC PDU subheaders may have the same order as the corresponding MAC SDUs, MAC control elements and padding. MAC control elements may be placed before any MAC SDU. Padding may occur at the end of the MAC PDU, except when single-byte or two-byte padding is required. Padding may have any value and the MAC entity may ignore it. When padding is performed at the end of the MAC PDU, zero or more padding bytes may be allowed. When single-byte or two-byte padding is required, one or two MAC PDU subheaders corresponding to padding may be placed at the beginning of the MAC PDU before any other MAC PDU subheader. In an example, a maximum of one MAC PDU may be transmitted per TB per MAC entity, a maximum of one MCH MAC PDU can be transmitted per TTI.

At least one RRC message may provide configuration parameters for at least one cell and configuration parameters for PUCCH groups. The information elements in one or more RRC messages may provide mapping between configured cells and PUCCH SCells. Cells may be grouped into a plurality of cell groups and a cell may be assigned to one of the configured PUCCH groups. There may be a one-to-one relationship between PUCCH groups and cells with configured PUCCH resources. At least one RRC message may provide mapping between an SCell and a PUCCH group, and PUCCH configuration on PUCCH SCell.

System information (common parameters) for an SCell may be carried in a RadioResourceConfigCommonSCell in a dedicated RRC message. Some of the PUCCH related information may be included in common information of an SCell (e.g. in the RadioResourceConfigCommonSCell). Dedicated configuration parameters of SCell and PUCCH resources may be configured by dedicated RRC signaling using, for example, RadioResourceConfigDedicatedSCell.

The IE PUCCH-ConfigCommon and IE PUCCH-ConfigDedicated may be used to specify the common and the UE specific PUCCH configuration respectively.

In an example, PUCCH-ConfigCommon may include: deltaPUCCH-Shift: ENUMERATED {ds1, ds2, ds3}; nRB-CQI: INTEGER (0.98); nCS-AN: INTEGER (0.7); and/or n1PUCCH-AN: INTEGER (0.2047). The parameter delta-PUCCH-Shift ($\Delta_{shift}^{PUCCH}$), nRB-CQI ($N_{RB}^{(2)}$), nCS-An ($N_{cs}^{(1)}$), and n1PUCCH-AN ($N_{PUCCH}^{(1)}$) may be physical layer parameters of PUCCH.

PUCCH-ConfigDedicated may be employed. PUCCH-ConfigDedicated may include: ackNackRepetition CHOICE{release: NULL, setup: SEQUENCE {repetitionFactor: ENUMERATED {n2, n4, n6, spare1}, n1PUCCH-AN-Rep: INTEGER (0.2047)}}, tdd-AckNackFeedback-Mode: ENUMERATED {bundling, multiplexing} OPTIONAL}. ackNackRepetitionj parameter indicates whether ACK/NACK repetition is configured. n2 corresponds to repetition factor 2, n4 to 4 for repetitionFactor parameter ($N_{ANRep}$). n1PUCCH-AN-Rep parameter may be $n_{PUCCH, ANRep}^{(1, \tilde{p})}$ for antenna port P0 and for antenna port P1. dd-AckNackFeedbackMode parameter may indicate one of the TDD ACK/NACK feedback modes used. The value bundling may correspond to use of ACK/NACK bundling whereas, the value multiplexing may correspond to ACK/NACK multiplexing. The same value may apply to both ACK/NACK feedback modes on PUCCH as well as on PUSCH.

The parameter PUCCH-ConfigDedicated may include simultaneous PUCCH-PUSCH parameter indicating whether simultaneous PUCCH and PUSCH transmissions is configured. An E-UTRAN may configure this field for the PCell when the nonContiguousUL-RA-WithinCC-Info is set to supported in the band on which PCell is configured. The E-UTRAN may configure this field for the PSCell when the nonContiguousUL-RA-WithinCC-Info is set to supported in the band on which PSCell is configured. The E-UTRAN may configure this field for the PUCCH SCell when the nonContiguousUL-RA-WithinCC-Info is set to supported in the band on which PUCCH SCell is configured.

A UE may transmit radio capabilities to an eNB to indicate whether UE support the configuration of PUCCH groups. The simultaneous PUCCH-PUSCH in the UE capability message may be applied to both a PCell and an SCell. Simultaneous PUCCH+PUSCH may be configured separately (using separate IEs) for a PCell and a PUCCH SCell. For example, a PCell and a PUCCH SCell may have different or the same configurations related to simultaneous PUCCH+PUSCH.

The eNB may select the PUCCH SCell among current SCells or candidate SCells considering cell loading, carrier quality (e.g. using measurement reports), carrier configuration, and/or other parameters. From a functionality perspective, a PUCCH Cell group management procedure may include a PUCCH Cell group addition, a PUCCH cell group release, a PUCCH cell group change and/or a PUCCH cell group reconfiguration. The PUCCH cell group addition procedure may be used to add a secondary PUCCH cell group (e.g., to add PUCCH SCell and one or more SCells in the secondary PUCCH cell group). In an example embodiment, cells may be released and added employing one or more RRC messages. In another example embodiment, cells may be released employing a first RRC message and then added employing a second RRC messages.

SCells including PUCCH SCell may be in a deactivated state when they are configured. A PUCCH SCell may be activated after an RRC configuration procedure by an activation MAC CE. An eNB may transmit a MAC CE activation command to a UE. The UE may activate an SCell in response to receiving the MAC CE activation command In example embodiments, a timer is running once it is started, until it is stopped or until it expires; otherwise it may not be running A timer can be started if it is not running or restarted if it is running. For example, a timer may be started or restarted from its initial value.

SCell activation/deactivation process was introduced in LTE-Advanced release-10 and beyond. If the MAC entity is configured with one or more SCells, the network may activate and deactivate the configured SCells. The SpCell may always be activated. The network may activate and deactivate the SCell(s) by sending one or more of Activation/Deactivation MAC control elements. The MAC entity may maintain a sCellDeactivationTimer timer per configured SCell and may deactivate the associated SCell upon its expiry. The same initial timer value may apply to each instance of the sCellDeactivationTimer and it is configured by RRC. An sCellDeactivationTimer IE is included in Mac-MainConfig dedicated parameter in an RRC message. The configured SCells may be initially be deactivated upon addition and after a handover.

Various implementation of the Activation/Deactivation MAC control element may be possible. In an example embodiment, the Activation/Deactivation MAC control element is identified by a MAC PDU subheader with a pre-assigned LCID. It may have a fixed size and comprise one or more octets containing C-fields and one or more R-fields. The activation/deactivation MAC control element may be defined as follows. Ci: if there is an SCell configured with SCellIndex i as specified in, this field indicates the activation/deactivation status of the SCell with SCellIndex i, else the MAC entity may ignore the Ci field. The Ci field is set to "1" to indicate that the SCell with SCellIndex i may be activated. The Ci field is set to "0" to indicate that the SCell with SCellIndex i may be deactivated; R: Reserved bit, set to "0". Other embodiments may be implemented. For example, when UE is configured with more than 5 or 7 carriers, the format may include more than one byte including a longer bitmap.

Various deactivation timer management processes may be implemented. In an example embodiment, if PDCCH on the activated SCell indicates an uplink grant or downlink assignment; or if PDCCH on the Serving Cell scheduling the activated SCell indicates an uplink grant or a downlink assignment for the activated SCell: the UE may restart the sCellDeactivationTimer associated with the SCell. Other example sCellDeactivationTimer embodiments may also be implemented. A deactivation timer of a PUCCH SCell may be disabled.

In the current LTE-Advanced transceiver operation, the MAC entity may for each TTI and for each configured SCell perform certain functions related to activation/deactivation of SCell(s). If the MAC entity receives an activation/deactivation MAC control element in this TTI activating the SCell, the MAC entity may in the TTI according to an activation timing, activate the SCell; start or restart the sCellDeactivationTimer associated with the SCell; and trigger PHR (power headroom). If the MAC entity receives an activation/deactivation MAC control element in this TTI deactivating the SCell; or if the sCellDeactivationTimer associated with the activated SCell expires in this TTI: in the TTI according to a deactivation timing; stop the sCellDeactivationTimer associated with the SCell; and/or flush all HARQ buffers associated with the SCell.

If the SCell is deactivated a UE may perform the following actions: not transmit SRS on the SCell; not report CQI/PMI/RI/PTI for the SCell; not transmit on UL-SCH on the SCell; not transmit on RACH on the SCell; not monitor the PDCCH on the SCell; not monitor the PDCCH for the SCell. When SCell is deactivated, the ongoing Random Access procedure on the SCell, if any, is aborted.

3GPP Technical Specification number TS 36.213: "Evolved Universal Terrestrial Radio Access (E-UTRA); Physical Layer Procedures" addresses the timing for secondary cell activation/deactivation. Section 4.3 of 3GPP TS 36.213 V11.2.0 (2013-02) (Release 11) describes that when a UE receives a MAC activation command for a secondary cell in subframe n, the corresponding actions in the MAC layer shall be applied in subframe n+8. When a UE receives a MAC deactivation command for a secondary cell or a secondary cell's deactivation timer expires in subframe n, the corresponding actions in the MAC layer shall apply no later than subframe n+8, except for the actions related to CSI reporting which shall be applied in subframe n+8.

Due to some timing issues with the requirements defined in 3GPP TS 36.213 V11.2.0 (2013-02) (Release 11), section 4.3 was updated in the subsequent release. Section 4.3 of 3GPP TS 36.213 (in all releases from V11.3.0/2013-02 to V12.4/2014-12: the most recent release) relaxes some of the timing requirements for the UE. The updated section 4.3 describes that when a UE receives a MAC activation command for a secondary cell in subframe n, the corresponding actions in the MAC layer shall be applied no later than the minimum requirement defined in 3GPP TS 36.133 and no earlier than subframe n+8, except for the following: the actions related to CSI reporting and the actions related to the sCellDeactivationTimer associated with the secondary cell, which shall be applied in subframe n+8. When a UE receives a MAC deactivation command for a secondary cell or the sCellDeactivationTimer associated with the secondary cell expires in subframe n, the corresponding actions in the MAC layer shall apply no later than the minimum requirement defined in 3GPP TS 36.133, except for the actions related to CSI reporting which shall be applied in subframe n+8. 3GPP TS 36.133 describes the SCell activation delay requirement for a deactivated SCell. Deactivation delay may take longer than 8 msec depending on a UE conditions with respect to the SCell.

The current LTE-Advanced specifications requires that when a UE receives a MAC activation command for a secondary cell in subframe n, the actions related to CSI reporting and the actions related to the sCellDeactivationTimer associated with the secondary cell, are applied in subframe n+8. The current LTE-Advanced specifications requires that when a UE receives a MAC deactivation command for a secondary cell or other deactivation conditions are met (e.g. the sCellDeactivationTimer associated with the secondary cell expires) in subframe n, the actions related to CSI reporting are applied in subframe n+8.

In the current LTE-Advanced transceiver operations when a UE receives a MAC activation command for an SCell in subframe n, the UE starts reporting CQI/PMI/RI/PTI for the SCell at subframe n+8 and starts or restarts the sCellDeactivationTimer associated with the SCell at subframe n+8. It is important to define the timing of these actions for both UE and eNB. For example, sCellDeactivationTimer is maintained in both eNB and UE and it is important that both UE and eNB stop, start and/or restart this timer in the same TTI. Otherwise, the sCellDeactivationTimer in the UE may not be in-sync with the corresponding sCellDeactivationTimer in the eNB. Also eNB starts monitoring and receiving CSI (CQI/PMI/RI/PTI) according to the predefined timing in the same TTI and/or after UE starts transmitting the CSI. If the CSI timings in UE and eNB are not coordinated based on a common standard or air interface signaling the network operation may result in inefficient operations and/or errors. CSI may include, e.g., channel quality indicator (CQI), preceding matrix indicator (PMI), and/or rank indicator (RI).

An example CQI indices and their interpretations are given in FIG. 14A (Table 1) for reporting CQI based on QPSK, 16QAM and 64QAM. An example CQI indices and their interpretations are given in FIG. 13B (Table 2) for reporting CQI based on QPSK, 16QAM, 64QAM and 256QAM. These tables are for example only and other tables may be developed for providing CQI feedback. In an example embodiment, based on an unrestricted observation interval in time and frequency, the UE may derive for each CQI value reported in uplink subframe n the highest CQI index between 1 and 15 in Table 1 or Table 2 which satisfies the following condition, or CQI index 0 if CQI index 1 does not satisfy the condition: a single PDSCH transport block with a combination of modulation scheme and transport block size corresponding to the CQI index, and occupying a group of downlink physical resource blocks termed the CSI reference resource, could be received with a transport block error probability not exceeding 0.1.

In an example embodiment, when a UE transmits/reports CQI or in general CSI to the base station, the UE may transmit a valid or invalid CSI. For example, a UE may transmit a CQI index of 0, which indicates an out of range value. In the example embodiments, when it is indicated that the UE transmits CSI it refers to transmission of a valid or invalid CSI, and/or in range or out of range CSI. When explicit transmission of valid or invalid CSI is intended, it is explicitly indicated that valid or invalid CSI is transmitted. In an example embodiment, a UE may initially transmit invalid CSI until UE successfully detects and is able to measure CSI for a given cell. When an eNB receives an invalid CSI, the eNB may take a proper action according to its implementation. In an example, when a UE is unable to measure a downlink signal, it may report an invalid CQI. In an example, when a UE obtain a measurement of a downlink signal below a threshold, it may report an invalid CQI.

Figure 15A:
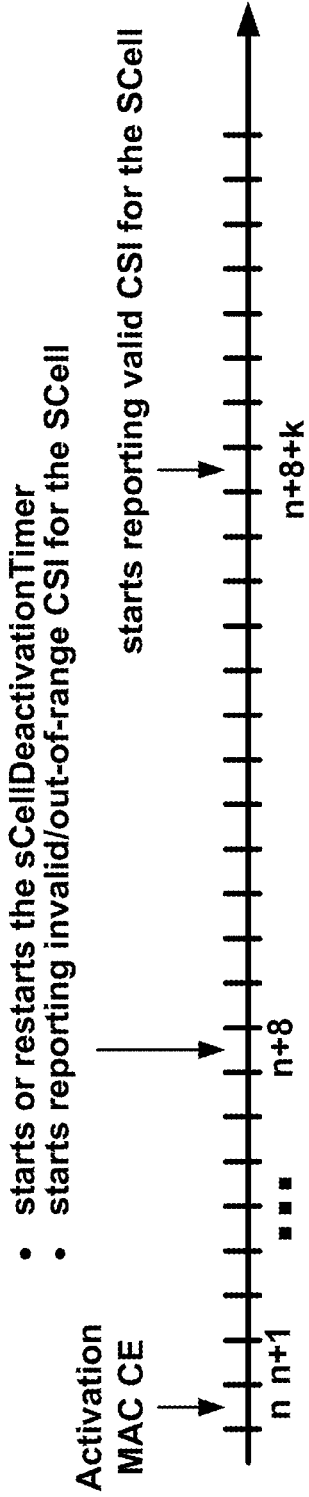
FIGS. 15A and 15B are example diagrams illustrating timing of different events according to the current LTE-Advanced transceivers.
Figure 15B:
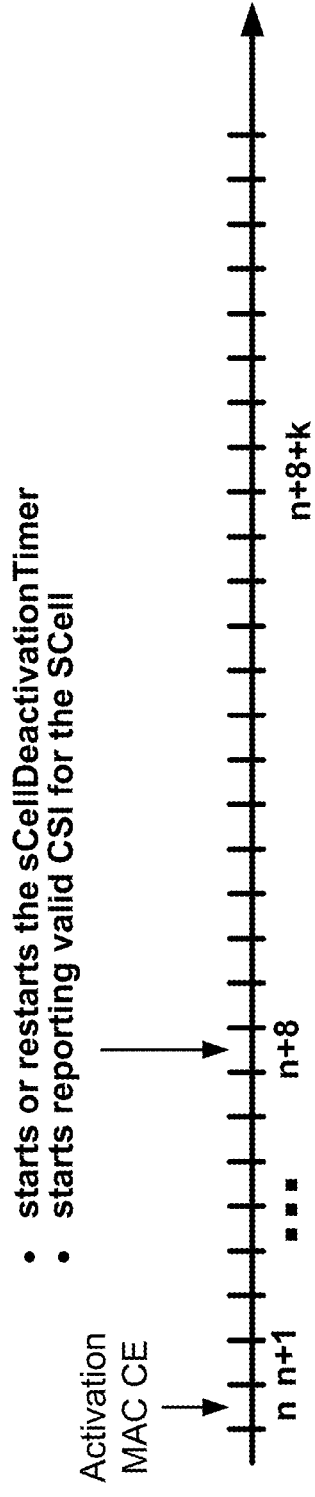

FIGS. 15A and 15B are example diagrams illustrating timing of different events according to the current LTE-Advanced transceivers. The MAC entity receives the Activation MAC CE activating the SCell (e.g. Activation/Deactivation MAC CE activating the SCell) in subframe (TTI) n. The MAC entity starts or restarts the sCellDeactivation-Timer associated with the SCell in subframe n+8. The MAC entity starts reporting CSI (CQI/PMI/RI/PTI) reporting for the SCell in subframe n+8. Other activation actions listed below (if configured) are applied no later than the minimum defined delay requirement and no earlier than subframe n+8. Other actions include one or many of the following: SRS transmissions on the SCell; PDCCH monitoring on the SCell; PDCCH monitoring for the SCell; trigger PHR. For example, the other actions may be applied in subframe n+8 or later at subframe n+12, n+13, or n+k, wherein k is a number between 0 and an upper limit which is pre-defined/pre-configured for certain scenarios. Other actions necessarily do not need to happen in the same subframe. An example upper limit for k is described below.

In an example scenario, when a secondary cell activation MAC CE in received in subframe n, the UE may be able to transmit uplink signals for the secondary cell on or before subframe n+24 provided the following conditions are met for the SCell:

During the period equal to max (5 measCycleSCell, 5 DRX cycles) before the reception of the SCell activation command:
the UE has sent a valid measurement report for the SCell being activated and
the SCell being activated remains detectable according to a cell identification conditions,
SCell being activated also remains detectable during the SCell activation delay according to the cell identification conditions.

Otherwise upon receiving the SCell activation command in subframe n, the UE may be capable to transmit valid CSI report and apply other actions related to the activation command for the SCell being activated no later than in subframe n+34 provided the SCell can be successfully detected on the first attempt.

In an example embodiment, while activating an SCell if any other SCell is activated, deactivated, configured and/or deconfigured by the UE then the UE activation delay may increase. For example, the increase in activation delay may depend on the number of times the other one or more SCells are activated, deactivated, configured or deconfigured while the SCell is being activated.

If there is no reference signal received for the CSI measurement over the delay corresponding to the minimum requirements specified above, then the UE may report corresponding valid CSI for the activated SCell on the next available uplink reporting resource after receiving the reference signal.

If there are no uplink resources for reporting the valid CSI in subframe n+24 or n+34 then the UE may use the next available uplink resource for reporting the corresponding valid CSI.

The valid CSI is based on the UE measurement and corresponds to any CQI value with the exception of CQI index=0 (out of range) provided: certain conditions are met over the entire SCell activation delay and the conditions defined for CQI reporting are met. In addition to CSI reporting defined above, UE may also apply other actions related to the activation command specified in for an SCell at the first opportunities for the corresponding actions once the SCell is activated.

In practice a UE may have shorter or longer deactivation delay than the minimum requirement specified above depending on the transceiver state, air interface quality, etc. Activation delay may depend on when a detection attempt, by a UE (wireless device), for the secondary cell is successful. The UE may have a shorter UE SCell activation delay than the UE SCell activation delay described above depending on air interface and UE conditions. The UE and/or the network may benefit from reduced SCell activation delay by the UE.

To activate an SCell, the UE may need to acquire PSS/SSS (sync signals) signals, if synchronization signals are not acquired. In an example embodiment, there may the following different scenarios for the SCell activation: a) cold-start 1: SCell RF is not activated; timing information is unknown; not possible for intraband contiguous CA, b) cold-start 2 SCell RF is not activated; timing information is known, c) warm-start: RF is already active; and timing information is known. For example, the maximum allowed activation time for cold-start 2, where an SCell RF chain is not activated, but SCell timing information is known, may be 24 ms. 4 ms may be needed for UE to decode an activation command (MAC control element) and transmit ACK, and 20 ms may be needed for RF warm-up, AGC settling, and frequency and time tracking loops warm-up. RF warm-up and AGC settling may be achieved within a few milliseconds (<4 ms) or a even shorter time period by applying additional technique.

Currently, the MAC entity receives the activation MAC CE activating the SCell (e.g. activation/deactivation MAC CE activating the SCell). The MAC entity start or restart the sCellDeactivationTimer associated with the SCell in subframe n+8. The MAC entity starts reporting CSI (CQI/PMI/RI/PTI) reporting for the SCell in subframe n+8 no matter whether the secondary cell is properly acquired or not.

As illustrated in the example FIG. 15A, the UE may start reporting invalid/out-of-range CSI for the SCell until valid CSI is available. As shown in example FIG. 15B, UE starts reporting valid CSI in subframe n+8+k, wherein k depends on when a valid CSI is available.

Starting time for CQI report transmission does not depend on different UE implementation. This enhances PUCCH decoding process on PCell. Minimum requirement of when valid CQI result is send is specified. As discussed the UE may exceed the minimum requirement in some scenarios. Such probability may be reduced as much as possible. In an example embodiment, if CQI report is configured, out of range CQI/CSI may be reported before the UE is able to perform CSI measurement for the SCell. The UE may be able to transmit valid CSI no later than subframe n+24[+X] for Transmission Modes (TM) other than TM9 and 4 ms after the first CSI-RS subframe since n+24[+X] for TM9. X is may be a predefined parameter, for example, may be equal to 10.

There could be a certain period that the UE does not have valid CQI results for an SCell upon the activation of the SCell. The period may depend on when the UE successfully detects the cell and/or when the UE starts CQI measurement which may vary depending on the air interface condition, signal (e.g. CSI RS) timings and/or UE implementation. Starting time for CQI report transmission does not depend on different UE implementations. The UE may start reporting CQI from subframe n+8 and a fixed value (e.g. our of range) may be reported when there are no valid CQI results available for the SCell. This would reduce the possibility that CQI size uncertainty complicates the eNB decoding of uplink channel. A timing requirement may be set when the UE has valid CQI results for the SCell at the latest after activation. A UE implementation may reduce the probability of exceeding this timing requirement.

FIG. 15B shows another example when UE has a shorter activation delay and valid CSI are available. The UE may start reporting a valid CSI starting subframe n+8.

When a UE starts reporting CSI in subframe n+8, it does not necessarily imply that UE transmits CSI in subframe n+8. The UE may transmit CSI in the first available CSI resources allocated to UE starting subframe n+8. For example, the UE may transmit the first CSI in subframe n+8, n+10, etc depending on when the first available CSI resource is available.

Some example embodiments of the invention improves the signal timings of FIGS. 15A and 15B to enhance CSI and other uplink control signaling transmission mechanisms when at least one PUCCH SCell is configured.

Figure 16:
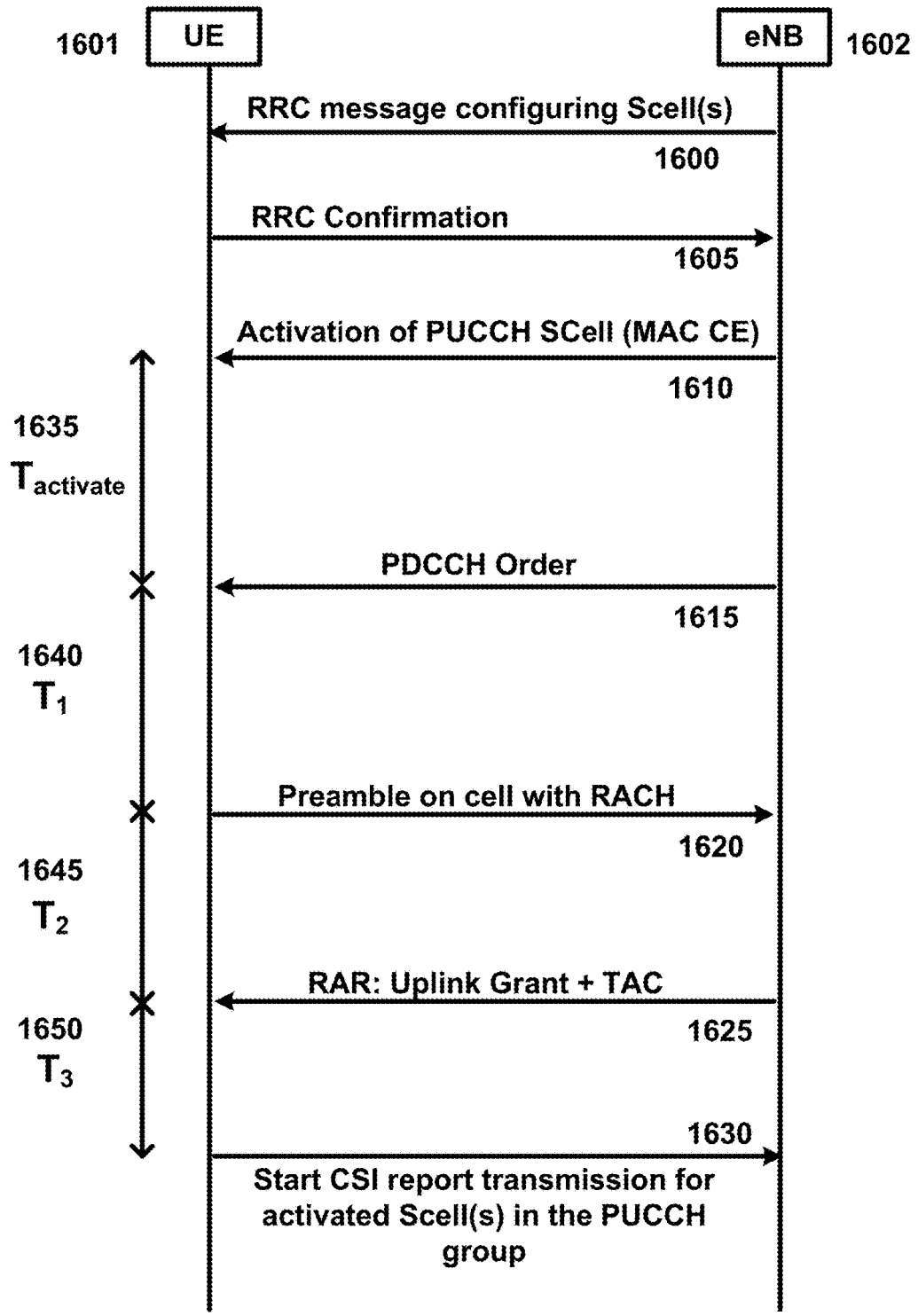
FIG. 16 is an example signaling flow and signal timing as per an aspect of an embodiment of the present invention.

FIG. 16 is an example signalling flow and signal timing as per an aspect of an embodiment of the present invention. An eNB 1602 may transmit to a UE 1601 one or more RRC messages comprising configuration parameters of cells and a PUCCH SCell and PUCCH groups. An RRC message 1600 is shown in FIG. 16. The UE may configure at least one PUCCH SCell. The UE may transmit an RRC confirmation message 1605 back to the eNB confirming a received RRC message.

The eNB may transmit a MAC activation command 1610 to activate the PUCCH SCell. The UE may receive the activation command at subframe n, and may perform downlink actions related to the SCell activation command for the PUCCH SCell being activated no later than the SCell activation delay as described in the specification (T_activate 1635). The activation delay may depend on the UE conditions before and at the time it receives the activation command and during the activation period.

If the UE does not have a valid TA for transmitting on a PUCCH SCell (when PUCCH SCell belongs to an unsynchronized sTAG), the eNB may transmit a PDCCH order 1615 to initiate a random access process on the sTAG. The a PDCCH order may initiate a random access process on an SCell in the sTAG, e.g. the PUCCH SCell if PUCCH SCell includes PRACH resources. In an example, the UE may receive a PDCCH order to initiate RA procedure on the PUCCH SCell during the activation period. If PDCCH order is received with some additional delays, it may result in further delay in the CSI report transmission. In an example, the eNB may initiate a random access process on a cell (e.g. different from PUCCH SCEll) in the sTAG. If PRACH is not on PUCCH Scell, the Scell with PRACH may be activated before transmission of PDCCH Order and PUCCH Scell may be activated before, during or after the RACH process. The UE may transmit a preamble 1620 on the SCell with PRACH according to the PDCCH order. A preamble 1620 (Msg1) may be sent by a UE in response to a PDCCH order 1615 on an SCell belonging to the sTAG. In an example embodiment, preamble transmission for SCells may be controlled by the network using PDCCH format 1A. The delay between receiving PDCCH order and preamble transmission may be T1 1640. The delay T1 may depend on when the UE acquires the first available PRACH occasion in the PUCCH SCell (or another cell in the sTAG with PRACH). In an example, T1 may be up to 25 subframes and the actual value of T1 may depend on the PRACH configuration.

The eNB may transmit a random access response (RAR) 1625 in response to the preamble transmission on the SCell. The RAR 1625 may be addressed to RA-RNTI in a PCell common search space (CSS). The RAR may include an uplink grant for the SCell with PRACH (e.g. PUCCH SCell) and a timing advance command for the sTAG. The delay T2 1645 is the delay between transmitting the Preamble 1620 and receiving a RAR with a valid TA command for the sTAG to which the PUCCH SCell belongs. In an example, T2 may be up to 13 subframes.

In an example, when the RAR 1625 is received in subframe k, one or more TB(s) may be transmitted in subframe k+4 in response to the uplink grant. Uplink TB(s) may be transmitted on the SCell in which the preamble 1620 was transmitted (e.g. PUCCH SCell). The UE may apply the received TAC to the sTAG after the delay T3 1650. The delay T3 may be the delay for applying the received TA for uplink transmission timing. For example, T3 is 6 subframes. A first TB may be transmitted before uplink transmission timing is adjusted. The UE may start transmission of valid CSI reports 1630 for the activated SCell(s) (including PUCCH SCell) in the PUCCH group after T_delay=T_activate+T1+T2+T3 as shown in FIG. 16.

In an example embodiment, the valid CSI transmission delay may increase when eNB further delays transmission of the PDCCH order. The valid CSI transmission delay may increase when eNB further delays transmission of the RAR. The valid CSI transmission delay may increase when RA on PUCCH SCell is interrupted by the RA on PCell.

In an example embodiment, the eNB may activate and uplink synchronize PUCCH SCell. After PUCCH SCell is activated and uplink synchronized then PUCCH information for the cells in PUCCH group may be transmitted in the uplink. In an example, for a PUCCH group, in which PUCCH SCell is in a TAG that its time-alignment is not running, no downlink shared channel transport block may be received on DL-SCH until PUCCH is activated and uplink synchronized using RACH. DL-SCH TBs may be received after the UE reports valid CQI.

An example embodiment enhances activation mechanisms. When an SCell is activated, CSI reports may be transmitted in the uplink after PUCCH SCell is activated and uplink synchronized. DL-SCH packets (TBs) may be received on PUCCH group after a first CSI is transmitted for the SCell(s) on an activated and uplink synchronized PUCCH SCell.

Figure 17:
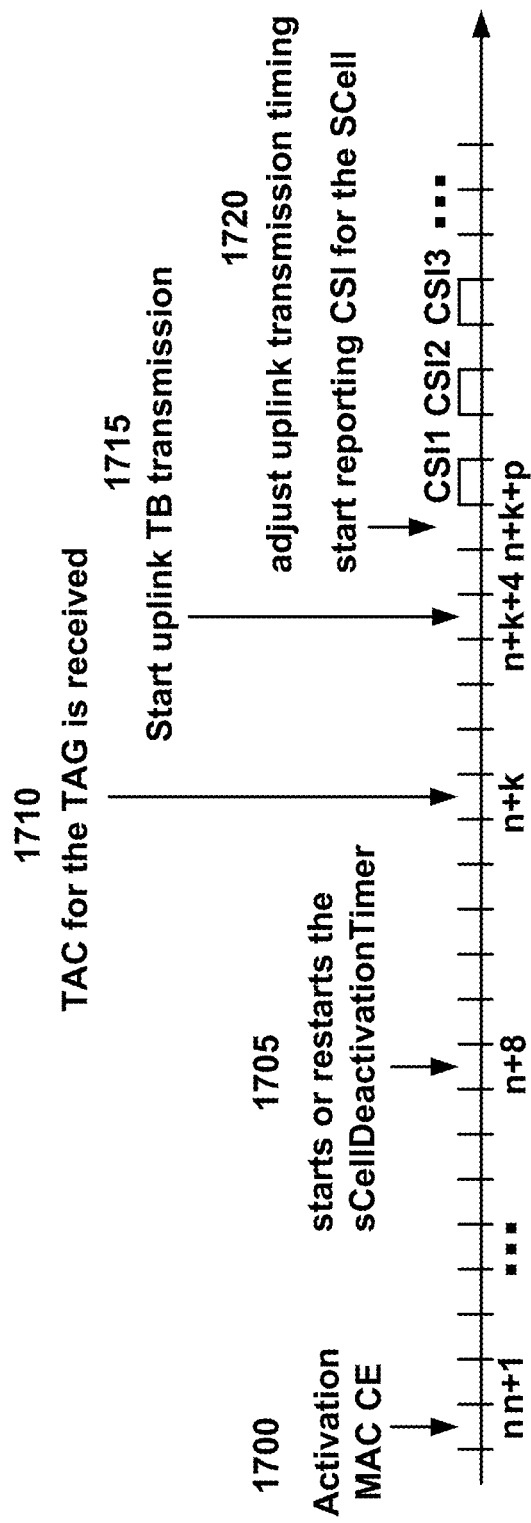
FIG. 17 is an example signaling timing as per an aspect of an embodiment of the present invention.

FIG. 17 is an example signaling timing as per an aspect of a disclosed embodiment. When a PUCCH SCell is activated in a TAG, the TAG may not be uplink synchronized. For example PUCCH SCell may be activated in an sTAG that is not uplink synchronized. FIG. 17 shows example diagrams illustrating timing of some events according to an example embodiment of the invention. In the example embodiment of the invention, when a UE receives a MAC activation command for a PUCCH SCell in subframe n, the UE starts or restarts the sCellDeactivationTimer associated with the PUCCH SCell at subframe n+m (e.g. m=8). In another example, the PUCCH SCell may already be activated. The PUCCH SCell may be configured in an out-of-sync TAG, or the TAG including the PUCCH SCell may become out-of-sync because the corresponding time alignment timer expires. When the TAG including the PUCCH SCell is out-of-sync, the UE may stop uplink transmission in the PUCCH SCell including transmission of PUCCH signals. The eNB may initiate a random access process to initially uplink synchronize a TAG, or to synchronize a TAG that has become unsynchronized.

In an example embodiment, an eNB may initiate a random access process on a secondary cell of the TAG including the PUCCH SCell. The secondary cell may be the PUCCH SCell itself, if it includes RACH resources. The eNB may transmit a PDCCH order for transmission of a random access preamble. The UE may transmit a random access preamble in the uplink in the resources identified by the PDCCH order. The random access response includes an uplink grant and a timing advance command (TAC) 1710. The UE may receive the TAC in a random access response in subframe n+k. The parameter k may depend, for example, on when the eNB transmits the PDCCH order, PRACH configuration, the number of successive preamble transmission until successful reception of the RAR, and/or other parameters. The UE may start the time alignment timer when a TAC is received. Example embodiments of the invention describe enhanced mechanisms for transmission of CSI on the PUCCH SCell after a TAC is received for an out-of-sync TAG including the PUCCH SCell.

The timing advance command 1710 is received in subframe n+k. In an example embodiment of the invention, a UE may start transmission of uplink CSI (CSI1, CSI2, CSI3, . . . in FIG. 17) starting subframe n+k+p (in the first available PUCCH resource on or after subframe n+k+p), wherein p is a natural number greater than zero. If the PUCCH SCell has completed the activation process, the CSI report may include valid CSI reports. When measurement value of a radio link quality is above a threshold, the CSI (e.g. CQI) may be valid CSI reports, and when measurement of a link quality is below a threshold the CSI report may be invalid CSI reports.

The TAC in the RAR is received in subframe n+k. The UE may start the time alignment timer of a TAG after it receives a TAC for the TAG. The UE may start reporting CSI when time alignment timer of the TAG including the PUCCH SCell is running. The UE may start reporting CSI in subframe n+k+p, wherein p is greater than zero. The UE may start reporting CSI in the first available CSI resource (in PUCCH resource) on or after n+k+p. In the example FIG. 17, the UE transmits CSI in subframe n+k+p+1 (CSI1), n+k+p+3 (CSI2), n+k+p+5 (CSI3), etc. FIG. 17 shows an example configuration. PUCCH resources for a given UE are configured using RRC control messages. When the PUCCH SCell starts transmitting CSI from subframe n+k+p, it implies that the UE transmits CSI in the first available CSI resources on the PUCCH SCell on or after subframe n+k+p.

The corresponding adjustment of the uplink transmission timing for the received TAC may be applied from the beginning of subframe n+k+p (e.g. p=6 subframes). In an example embodiment, for serving cells in the same TAG, when the UE's uplink transmissions in subframe n+k+p and subframe n+k+p+1 are overlapped due to the timing adjustment, the UE may complete transmission of subframe n+k+p and not transmit the overlapped part of subframe n+k+p+1.

The UE may adjust its uplink transmission timing from the beginning of the subframe n+k+p. CSIs that are received may be time aligned with the base station subframes and may not interfere with signals in other subframes. In FIG. 17, for example CSI1, CSI2, CSI3 may be received with the required subframe timing adjustments. In some scenarios, the required time adjustment may be very small (for example when the cell size is small and/or the UE is close to the eNB and propagation delay is small). In some scenarios, the required adjustment is relatively large (for example when the cell size is large and UE is close to the cell edge). Transmission of CSIs after the uplink timing is adjusted increases the probability that CSIs are received within subframe period independent of what is the scenario and the condition of the UE. Since the delay in transmission of CSI is relatively small, it may be beneficial to delay reporting CSI until subframe n+k+p when the timing is adjusted. The UE may transmit valid or invalid CSI depending on the availability and/or the range of the measured CSI.

FIG. 17 illustrates an example configuration wherein CSI reports are transmitted on or after the timing is adjusted. In an example scenario, the time alignment timer of the PUCCH SCell may be started before n+k+p. The CSI (e.g. CSI1, CSI2, CSI3, . . . in FIG. 17) is reported in the first available PUCCH resources on or after n+k+p. In case there is no available PUCCH resources on n+k+p, then no CSI may be transmitted on n+k+p. Then even though CSI reporting starts in subframe n+k+p, no CSI is transmitted on subframe n+k+p. In an example embodiment, the time alignment timer may be restarted before subframe n+k+p (e.g. n+k or n+k+1), and the UE may start transmitting other uplink signals before the subframe n+k+p.

The UE may start other uplink transmissions such as UL-SCH transmissions before n+k+p. For example, a UE may transmit an uplink transport block 1715 in subframe n+k+4 when it receives an uplink grant in the random access response in subframe n+k. For example, if the PUCCH SCell is configured with SRS, the UE may start transmitting SRS after it receives the TAC and before subframe n+k+p. This may be because CSI information may more critical than SRS and/or UL-SCH signals. Decoding CSI signals may be more complex than decoding SRS and/or UL-SCH signals. Earlier starting point for SRS transmissions may enable eNB to start estimation of channel conditions and other channel parameters a bit earlier. For example, the UE may start CSI transmissions on or after subframe n+k+6, when p=6. PUCCH has completed the activation process and the CSI report may include valid CSI reports. When measurement value of a radio link quality is above a threshold, the CSI (e.g. CQI) may be valid CSI reports, and when measurement of a link quality is below a threshold and/or a measurement is not available the CSI report may be invalid CSI reports.

In an example embodiment, the MAC entity may have a configurable timer timeAlignmentTimer per TAG. The time-AlignmentTimer may be used to control how long the MAC entity considers the Serving Cells belonging to the associated TAG to be uplink time aligned. The MAC entity may: when a Timing Advance Command MAC control element is received: apply the Timing Advance Command for the indicated TAG; start or restart the timeAlignmentTimer associated with the indicated TAG. The MAC entity may: when a Timing Advance Command is received in a Random Access Response message for a serving cell belonging to a TAG:→If the Random Access Preamble was not selected by the MAC entity: apply the Timing Advance Command for this TAG; and start or restart the timeAlignmentTimer associated with this TAG. Else if the timeAlignmentTimer associated with this TAG is not running: apply the Timing Advance Command for this TAG; and start the timeAlignmentTimer associated with this TAG; when the contention resolution is considered not successful, stop timeAlignmentTimer associated with this TAG. Else, The MAC entity ignore the received Timing Advance Command.

When a timeAlignmentTimer expires, if the timeAlignmentTimer is associated with the pTAG: The MAC entity may perform one, many or all the following: flush all HARQ buffers for all serving cells; notify RRC to release PUCCH/SRS for all serving cells; clear any configured downlink assignments and uplink grants. In an example implementation, the MAC entity may further consider running timeAlignmentTimers of sTAGs as expired.

If the timeAlignmentTimer is associated with an sTAG expires, then for all Serving Cells belonging to this TAG: The MAC entity may perform one, many or all the following functions: flush all HARQ buffers; notify RRC to release SRS.

In addition, if the serving cell is a PUCCH SCell and the timeAlignmentTimer of the TAG including the serving cell (the PUCCH SCell) expires, then the UE may perform one or more of the following actions. The MAC entity in the UE may notify RRC in the UE to release PUCCH of the PUCCH SCell. The UE may may clear any configured downlink assignments received for seving cells in the corresponding PUCCH group (If cross carrier scheduling between cells of different PUCCH groups are not allowed, this would equally imply the UE may may clear any configured downlink assignments received on seving cells in the corresponding PUCCH group.). The UE may clear any HARQ processes for downlink packets in the corresponding PUCCH group. When the time alignment of a TAG is expired, the UE may stop uplink transmissions in the cell group, except random access preamble transmissions. The UE may also clear uplink grants received for serving cells of a TAG with expired timeAlignmentTimer. The UE may stop transmission of PUCCH on the PUCCH SCell for SCells in the corresponding PUCCH group. In an example embodiment, the UE may continue monitoring PDCCH and transmit uplink packets and SRSs in serving cell(s) of the PUCCH group if the serving cells are in an in-sync TAG. In an example embodiment, the UE may continue monitoring receive broadcast information/transport blocks (e.g. Multicast CH, and/or MBSFN subframes) in downlink carrier(s) of the serving cell(s) of the PUCCH group.

In an example embodiment, if the timeAlignmentTimer, associated with the TAG containing the PUCCH SCell is stopped or expired, the MAC entity may not indicate a generated positive or negative acknowledgement to the physical layer for the cells in the PUCCH group. The UE may not transmit positive or negative acknowledgement to the eNB on the PUCCH SCell, when the timeAlignmentTimer, associated with the TAG containing the PUCCH SCell is stopped or expired. In an example embodiment, if the timeAlignmentTimer, associated with the TAG containing the PUCCH SCell is running and the PUCCH is activated, the MAC entity may indicate a generated positive or negative acknowledgement for one or more TB to the physical layer for the cells in the PUCCH group. The UE may transmit positive or negative acknowledgement to the eNB on the PUCCH SCell, when the timeAlignmentTimer, associated with the TAG containing the PUCCH SCell is running When the PUCCH SCell in a PUCCH group is in the out-of-sync state (belong to an out-of-sync TAG), the PUCCH SCell may not transmit PUCCH control information in the uplink PUCCH for the SCells in the corresponding PUCCH group. Other activated SCell(s) in a PUCCH group corresponding to an out-of-sync PUCCH SCell may not transmit uplink CQI/PMI/RI/PTI/HARQ-feedback reporting on PUCCH of the out-of-sync PUCCH SCell. In an example embodiment, in such a scenario, the UE may be able to receive uplink grants for an SCell in the PUCCH group and transmit uplink packets to the eNB, if the cell belong to an in-sync TAG. The UE may stop receiving DL-SCH transport blocks in the PUCCH group. In an example embodiment, UE may continue monitoring receive broadcast information/packets (e.g. MCH, and/or MBSFN subframes, etc) in downlink carrier(s) of the serving cell(s) of the PUCCH group. The UE may be able to receive downlink HARQ and downlink physical control channels (e.g. PBCCH, PCFICH, PDCCH, and/or ePDCCH) and/or broadcast channel on the SCell belong to in-sync TAG. The UE may not be able to provide downlink feedback information (e.g. CQI/PMI/RI/PTI/HARQ-feedback) on an out-of-sync PUCCH SCell.

In an example embodiment, when a PUCCH SCell is out-of-sync, the UE may clear any configured downlink assignments received for the SCells in the corresponding PUCCH group. The UE may clear any HARQ processes for downlink packets in the corresponding PUCCH group.

The following actions may be taken in an example implementation for when the serving cell is a PUCCH SCell and the timeAlignmentTimer of the TAG including the serving cell (the PUCCH SCell) expires. The UE may stop transmission of channel state information for a first secondary cell in the secondary PUCCH cell group, the first secondary cell being different from the PUCCH secondary cell. The UE may stop receiving downlink shared channel transport blocks on the first secondary cell in the secondary PUCCH cell group. The MAC entity may not indicate a generated positive or negative acknowledgement to the physical layer for a first secondary cell in the secondary PUCCH cell group, the first secondary cell being different from the PUCCH secondary cell. The UE may not transmit positive or negative acknowledgement to the eNB for a TB received on a first secondary cell in the secondary PUCCH cell group, the first secondary cell being different from the PUCCH secondary cell.

The UE may clear configured downlink shared channel assignments received for any SCell in the corresponding PUCCH group. In an example embodiment, the UE may not be able to process received downlink shared channel transport blocks since the corresponding PUCCH may not be available for HARQ feedback (PUCCH SCell is out-of-sync). For example, the UE may clear HARQ processes for downlink SCH transport blocks in the corresponding PUCCH group. In an example, the UE may flush HARQ processes for downlink shared channel transport blocks on the first secondary cell in the secondary PUCCH group.

In an example embodiment, the UE may stop processing assignments for downlink shared channel transport blocks received for/on the first secondary cell in the secondary PUCCH group. In an example, the UE may stop monitoring the PDCCH downlink assignments on the first secondary cell and may stop monitoring the PDCCH downlink assignments for the first secondary cell. The first secondary cell is an activated cell in the secondary PUCCH group, wherein the PUCCH secondary cell is out-of-sync. In an example, the UE may stop monitoring the PDCCH downlink assignments for downlink shared channel transport blocks on the first secondary cell and may stop monitoring the PDCCH downlink assignments for downlink shared channel transport blocks for the first secondary cell. The first secondary cell is an activated cell in the secondary PUCCH group, wherein the PUCCH secondary cell is out-of-sync.

The UE may stop transmission of PUCCH signals on the PUCCH SCell for SCells in the corresponding PUCCH group. In an example embodiment, the UE may continue receiving uplink grants comprising uplink radio resources grant for transmission of an uplink transport block on the first secondary cell in the secondary PUCCH group (if the the first secondary cell is in-sync). The UE may transmit the uplink transport blocks on the first secondary cell (if the the first secondary cell is in-sync). The UE may continue transmission of sounding reference signals on the first secondary cell in the secondary PUCCH cell group (if the the first secondary cell is in-sync). The UE may transmit uplink transport blocks and SRS in other serving cells of the PUCCH group when PUCCH SCell is out-of-sync (if other serving cells are in-sync).

The UE may receive MBSFN subframes and broadcast/multicast transport blocks in the downlink. MBSFN subframes configuration parameters indicating MBSFN subframes may be configured by system information broadcasted by eNB and/or RRC message(s). The UE may continue processing of the received broadcast/multicast control and data packets (e.g. transport blocks) and other broadcast information.

In an example embodiment, the MAC entity may not perform any uplink transmission on a Serving Cell except the Random Access Preamble transmission when the timeAlignmentTimer associated with the TAG to which this serving cell belongs is not running. The MAC entity may not receive or process any downlink grants for serving cells in a PUCCH group when the timeAlignmentTimer associated with the TAG including the corresponding PUCCH SCell is not running (If cross carrier scheduling between cells of different PUCCH groups are not allowed, this would equally imply the UE may clear any configured downlink assignments received on serving cells in the corresponding PUCCH group.). The UE may not transmit or process uplink CQI/PMI/RI/PTI/HARQ-feedback for serving cells in a PUCCH group when the timeAlignmentTimer associated with the TAG including the corresponding PUCCH SCell is not running. In example embodiment, when the timeAlignmentTimer associated with the pTAG is not running, the MAC entity may not perform any uplink transmission on any Serving Cell except the Random Access Preamble transmission on the SpCell.

In an example embodiment, a wireless device may receive at least one message comprising configuration parameters of a plurality of cells. The plurality of cells being grouped into a first plurality of timing advance groups (TAGs). The plurality of cells being grouped into a second plurality of physical uplink control channel (PUCCH) groups comprising: a primary PUCCH group; and a secondary PUCCH group. The secondary PUCCH group may comprise a PUCCH secondary cell with PUCCH resources. The PUCCH secondary cell may be in a first TAG in the first plurality of TAGs. When the PUCCH secondary cell is activated and a time alignment timer of the first TAG is not running, perform at least one of the following: not receiving downlink shared channel transport blocks on one or more activated cells in the secondary PUCCH group; and not transmitting of channel state information feedback for one or more activated cells in the secondary PUCCH group.

In an example embodiment, a wireless device may receive at least one message comprising configuration parameters of a plurality of cells. The plurality of cells are grouped into a first plurality of timing advance groups (TAGs). The plurality of cells being grouped into a second plurality of physical uplink control channel (PUCCH) group comprising: a primary PUCCH group; and a secondary PUCCH group comprising a PUCCH secondary cell with PUCCH resources. The PUCCH secondary cell is in a first TAG in the first plurality of TAGs. The wireless device may receive a command initiating transmission of a preamble on the first TAG. The wireless device may receive a response comprising a timing advance command (TAC). After applying the TAC to the first TAG, perform at least one of the following: transmitting, on the secondary cell, channel state information (CSI) of each activated cell in the secondary PUCCH group; receiving downlink shared channel transport blocks on one or more activated cells in the secondary PUCCH group. In an example implementation, the wireless device may be configured not to transmit the CSI and/or not to receive downlink shared channel transport blocks during a period between receiving the at least one message and applying the TAC.

Figure 18:
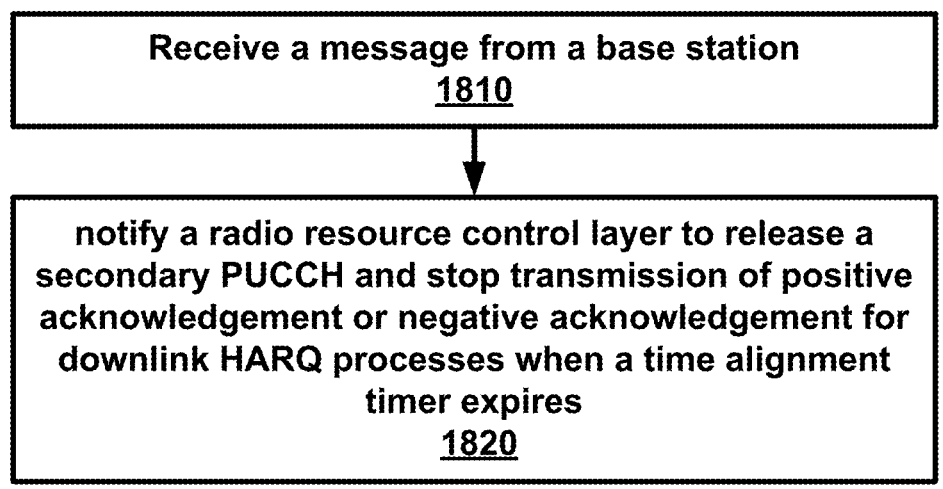
FIG. 18 is an example flow diagram as per an aspect of an embodiment of the present invention.

FIG. 18 is an example flow diagram as per an aspect of an embodiment of the present invention. A wireless device receives at least one message from a base station at 1810. The message may comprise configuration parameters of a plurality of cells. The plurality of cells may be grouped into a plurality of timing advance groups (TAGs), and a plurality of physical uplink control channel (PUCCH) groups. The plurality of physical uplink control channel (PUCCH) groups may comprise a primary PUCCH group and a secondary PUCCH group. The primary PUCCH group may comprise a primary cell with a primary PUCCH transmitted to a base station. The secondary PUCCH group may comprise a PUCCH secondary cell with a secondary PUCCH transmitted to the base station. The PUCCH secondary cell may be in a first TAG in the plurality of TAGs. According to an embodiment, the message(s) may comprises a first time alignment timer IE for the first TAG, and/or a second time alignment timer IE for a second TAG in the plurality of TAGs.

At 1820, a radio resource control layer may be notified to release the secondary PUCCH when a time alignment timer of the first TAG expires. Additionally, transmission of positive acknowledgement or negative acknowledgement for one or more downlink HARQ processes of an activated cell in the secondary PUCCH group may be stopped when the time alignment timer of the first TAG expires.

According to an embodiment, one or more of the downlink HARQ processes of downlink shared channel transport blocks of the activated cell in the secondary PUCCH group may be stopped when the time alignment timer of the first TAG expires. According to an embodiment, receiving downlink shared channel transport blocks on the activated cell in the secondary PUCCH group may be stopped when the time alignment timer of the first TAG expires. According to an embodiment, transmission of channel state information for the activated cell in the secondary PUCCH group may be stopped when the time alignment timer of the first TAG expires.

According to an embodiment, the first TAG may be considered: out-of-sync in response to the time alignment timer being expired or not running, and/or in-sync in response to the time alignment timer running. According to an embodiment, any configured downlink assignments received for the activated cell in the secondary PUCCH group may be cleared when the time alignment timer of the first TAG expires. According to an embodiment, transmission of uplink packets and uplink sounding reference signals on a serving cell may be continued when the time alignment timer of the first TAG expires. The serving cell may be in the secondary PUCCH group and the serving cell may not be in the first TAG. According to an embodiment, one or more of the downlink HARQ processes for downlink shared channel transport blocks on the activated cell in the secondary PUCCH group may be flushed when the time alignment timer of the first TAG expires. The plurality of TAGs may comprise the first TAG and a second TAG. Uplink transmission timing in the first TAG may be derived employing a first cell in the first TAG. Uplink transmission timing in the second TAG may be derived employing a second cell in the second TAG.

Figure 19:
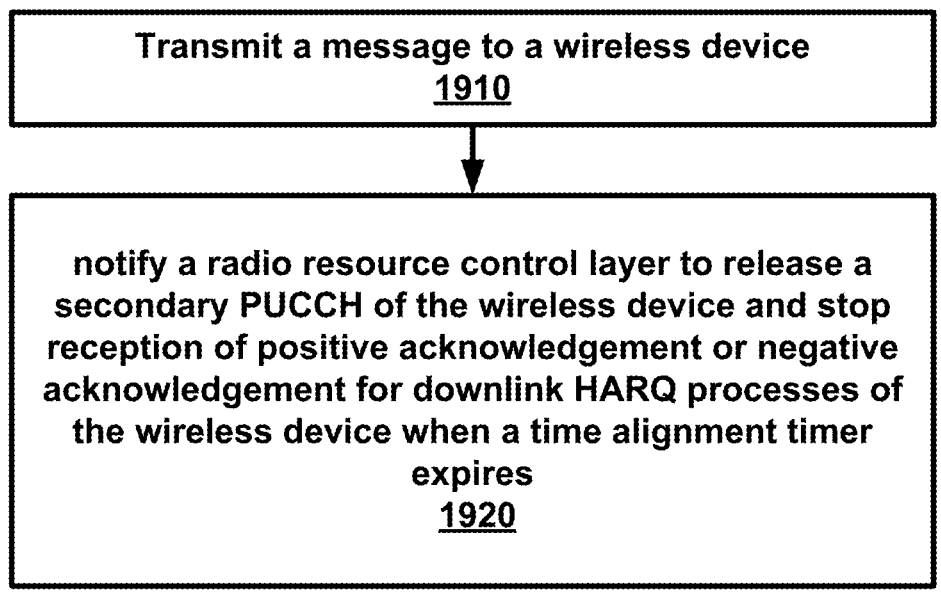
FIG. 19 is an example flow diagram as per an aspect of an embodiment of the present invention.

FIG. 19 is an example flow diagram as per an aspect of an embodiment of the present invention. A base station may transmit at least one message to a wireless device at 1910. The message may comprise configuration parameters of a plurality of cells. The plurality of cells may be grouped into a plurality of timing advance groups (TAGs), and a plurality of physical uplink control channel (PUCCH) groups. The plurality of physical uplink control channel (PUCCH) groups may comprise a primary PUCCH group and a secondary PUCCH group. The primary PUCCH group may comprise a primary cell with a primary PUCCH received by the base station. The secondary PUCCH group may comprise a PUCCH secondary cell with a secondary PUCCH received by the base station. The PUCCH secondary cell may be in a first TAG in the plurality of TAGs. According to an embodiment, the message(s) may comprises a first time alignment timer IE for the first TAG, and/or a second time alignment timer IE for a second TAG in the plurality of TAGs.

At 1920, a radio resource control layer may be notified to release the secondary PUCCH when a time alignment timer of the first TAG expires. Additionally, transmission of positive acknowledgement or negative acknowledgement for one or more downlink HARQ processes of an activated cell in the secondary PUCCH group may be stopped when the time alignment timer of the first TAG expires.

Figure 20:
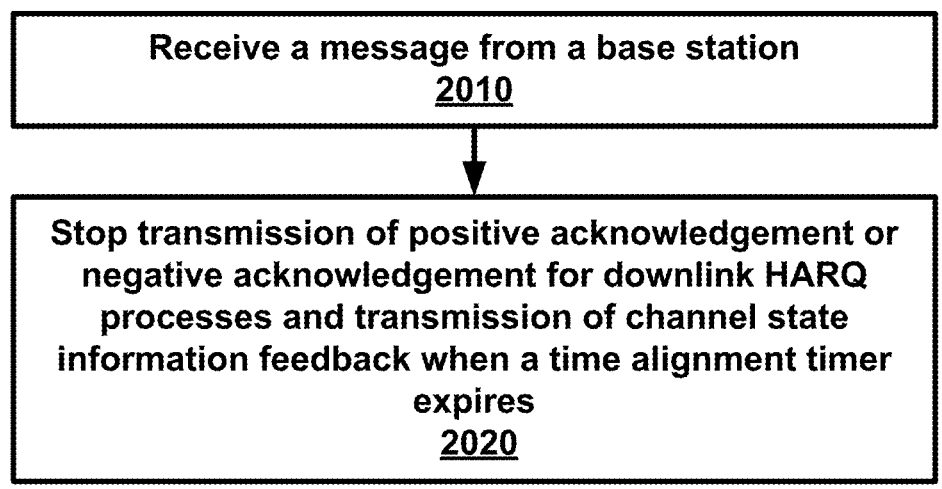
FIG. 20 is an example flow diagram as per an aspect of an embodiment of the present invention.

FIG. 20 is an example flow diagram as per an aspect of an embodiment of the present invention. A wireless device receives at least one message from a base station at 2010. The message may comprise configuration parameters of a plurality of cells. The plurality of cells may be grouped into a plurality of timing advance groups (TAGs) and a plurality of physical uplink control channel (PUCCH) groups. The plurality of physical uplink control channel (PUCCH) groups may comprise a primary PUCCH group and a secondary PUCCH group. The primary PUCCH group may comprise a primary cell with a primary PUCCH transmitted to a base station. The secondary PUCCH group may comprise a PUCCH secondary cell with a secondary PUCCH transmitted to the base station. The PUCCH secondary cell may be in a first TAG in the plurality of TAGs.

At 2020, transmission of positive acknowledgement or negative acknowledgement for downlink HARQ processes of an activated cell in the secondary PUCCH group may be stopped when a time alignment timer of the first TAG is stopped. Additionally, transmission of channel state information feedback for the activated cell may be stopped when the time alignment timer of the first TAG is stopped.

According to an embodiment, reception downlink shared channel transport blocks on the activated cell in the secondary PUCCH may be stopped. According to an embodiment, HARQ processes of downlink shared channel transport blocks of the activated cell maybe stopped when the time alignment timer of the first TAG is stopped.

According to an embodiment, transmission of uplink packets and uplink sounding reference signals on a serving cell may be continued when the time alignment timer of the first TAG is stopped. The serving cell may be in the secondary PUCCH group and the serving cell may not be in the first TAG.

According to an embodiment, the plurality of TAGs may comprise the first TAG and a second TAG. Uplink transmission timing in the first TAG may be derived employing a first cell in the first TAG. Uplink transmission timing in the second TAG may be derived employing a second cell in the second TAG.

Figure 21:
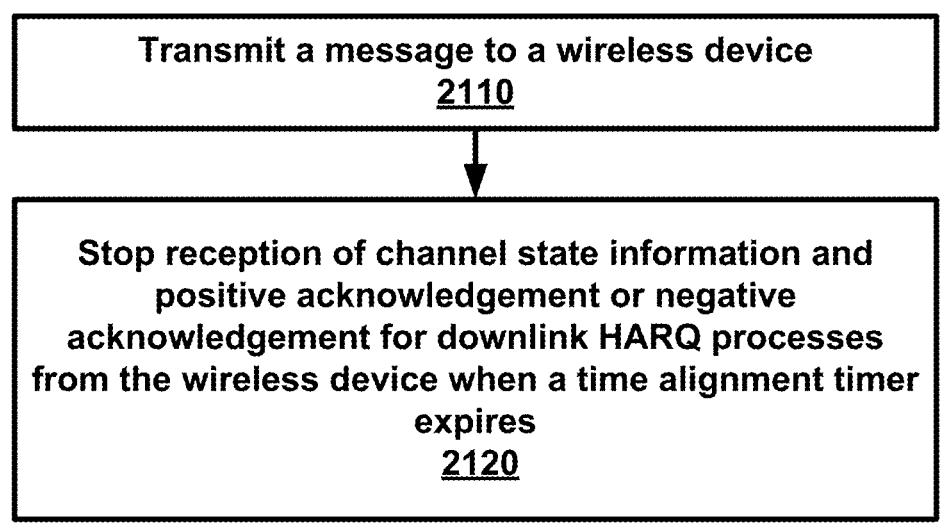
FIG. 21 is an example flow diagram as per an aspect of an embodiment of the present invention.

FIG. 21 is an example flow diagram as per an aspect of an embodiment of the present invention. A base station may transmit at least one message to a wireless device at 2110. The message may comprise configuration parameters of a plurality of cells. The plurality of cells may be grouped into a plurality of timing advance groups (TAGs) and a plurality of physical uplink control channel (PUCCH) groups. The plurality of physical uplink control channel (PUCCH) groups may comprise a primary PUCCH group and a secondary PUCCH group. The primary PUCCH group may comprise a primary cell with a primary PUCCH received by the base station. The secondary PUCCH group may comprise a PUCCH secondary cell with a secondary PUCCH received by the base station. The PUCCH secondary cell may be in a first TAG in the plurality of TAGs. According to an embodiment, the message(s) may comprises a first time alignment timer IE for the first TAG, and/or a second time alignment timer IE for a second TAG in the plurality of TAGs.

According to an embodiment, reception of channel state information on the secondary PUCCH from the wireless device may be stopped when a time alignment timer of the first TAG expires. According to an embodiment, reception of positive acknowledgement or negative acknowledgement for one or more downlink HARQ processes of an activated cell in the secondary PUCCH group from the wireless device may be stopped when a time alignment timer of the first TAG expires. According to an embodiment, the one or more downlink HARQ processes of downlink shared channel transport blocks of the activated cell may be stopped when the time alignment timer of the first TAG expires, the one or more downlink HARQ processes being for transport blocks of the wireless device. According to an embodiment, the first TAG may be considered out-of-sync in response to the time alignment timer being expired or not running. Additionally, the first TAG may be considered in-sync in response to the time alignment timer running According to an embodiment, the plurality of TAGs may comprise the first TAG and a second TAG. Uplink transmission timing in the first TAG may be derived employing a first cell in the first TAG. Uplink transmission timing in the second TAG may be derived employing a second cell in the second TAG.

Figure 22:
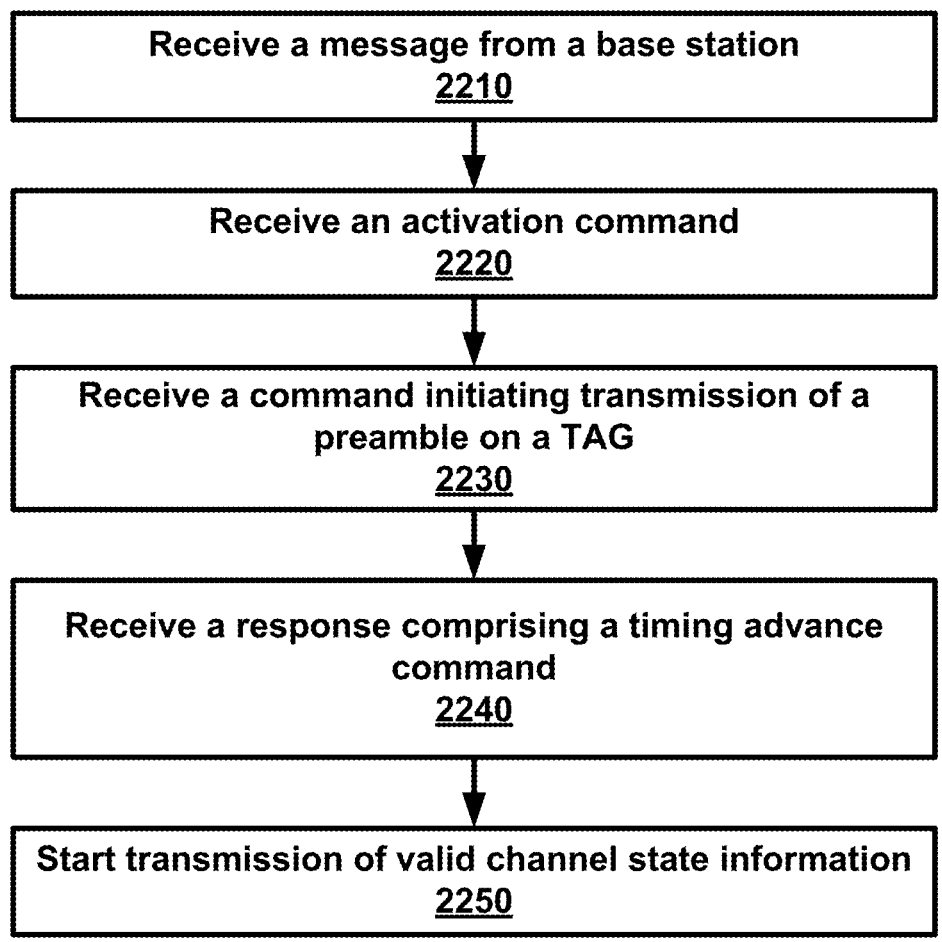
FIG. 22 is an example flow diagram as per an aspect of an embodiment of the present invention.

FIG. 22 is an example flow diagram as per an aspect of an embodiment of the present invention. A wireless device receives at least one message from a base station at 2210. The message may comprise configuration parameters of a plurality of cells. The plurality of cells may be grouped into a plurality of timing advance groups (TAGs). The plurality of cells may comprise a primary PUCCH group and a secondary PUCCH group. The primary PUCCH group may comprise a primary cell with a primary PUCCH transmitted to a base station. The secondary PUCCH group may comprise a PUCCH secondary cell with a secondary PUCCH transmitted to the base station. The PUCCH secondary cell may be in a first TAG in the plurality of TAGs.

According to an embodiment, the plurality of cells may be grouped into a plurality of PUCCH groups. The plurality of PUCCH groups may comprise a primary PUCCH group and a secondary PUCCH group. The primary PUCCH group may comprise the primary cell. The secondary PUCCH group may comprise the PUCCH secondary cell.

According to an embodiment, the plurality of TAGs may comprise the first TAG and/or a second TAG. Uplink transmission timing in the first TAG may be derived employing a first cell in the first TAG. Uplink transmission timing in the second TAG may be derived employing a second cell in the second TAG. According to an embodiment, at least one message may comprise: a first time alignment timer IE for the first TAG; and a second time alignment timer IE for a second TAG in the plurality of TAGs.

An activation command may be received in subframe n at 2220. Receiving. The activation command may activate the PUCCH secondary cell. According to an embodiment, the command may be received when a time alignment timer of the first TAG is not running A command initiating transmission of a preamble on the first TAG may be received at 2230. A response comprising a timing advance command (TAC) may be received at 2240. At 2250, transmission of valid channel state information (CSI) may be started on the PUCCH secondary cell in subframe n+k, wherein k is greater than eight and may be based on a delay from receiving the activation command until the wireless device applies the received TAC. According to an embodiment, the CSI may be for an activated cell in the secondary PUCCH group.

According to an embodiment, HARQ processes of downlink shared channel transport blocks of an activated cell in the secondary PUCCH group may be started on or after subframe n+k. According to an embodiment, downlink shared channel transport blocks on an activated cell in the secondary PUCCH group may start to be received on or after subframe n+k.

Figure 23:
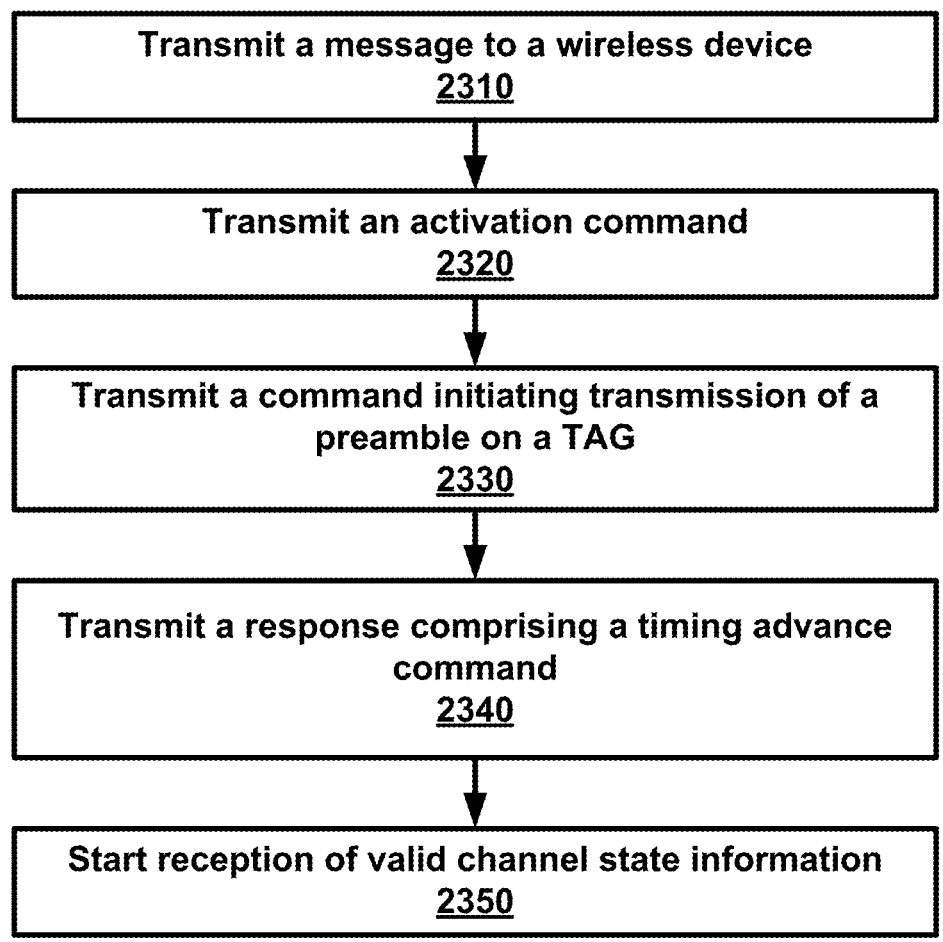
FIG. 23 is an example flow diagram as per an aspect of an embodiment of the present invention.

FIG. 23 is an example flow diagram as per an aspect of an embodiment of the present invention. A base station may transmit at least one message to a wireless device at 2310. The message may comprise configuration parameters of a plurality of cells. The plurality of cells may be grouped into a plurality of timing advance groups (TAGs). The plurality of cells may comprise a primary cell and a PUCCH secondary cell. The primary cell may comprise a primary physical uplink control channel (PUCCH). The PUCCH secondary cell may comprise a secondary PUCCH. The PUCCH secondary cell may be in a first TAG in the plurality of TAGs. According to an embodiment, the plurality of cells may be grouped into a plurality of PUCCH groups comprising: a primary PUCCH group and a secondary PUCCH group. The primary PUCCH group may comprise the primary cell. The secondary PUCCH group may comprise the PUCCH secondary cell.

An activation command activating the PUCCH secondary cell may be transmitted at 2320. The transmission of the activation command me be in subframe n. A command initiating transmission of a preamble on the first TAG may be transmitted at 2330. According to an embodiment, the command may be transmitted when a time alignment timer of the first TAG is not running A response comprising a timing advance command (TAC) may be transmitted at 2340. At 2350, reception of valid channel state information (CSI) from the wireless device on the PUCCH secondary cell in subframe n+k may be started started. k may be greater than eight and may be based on a delay from transmitting the activation command until the TAC is applied to uplink signals.

Figure 24:
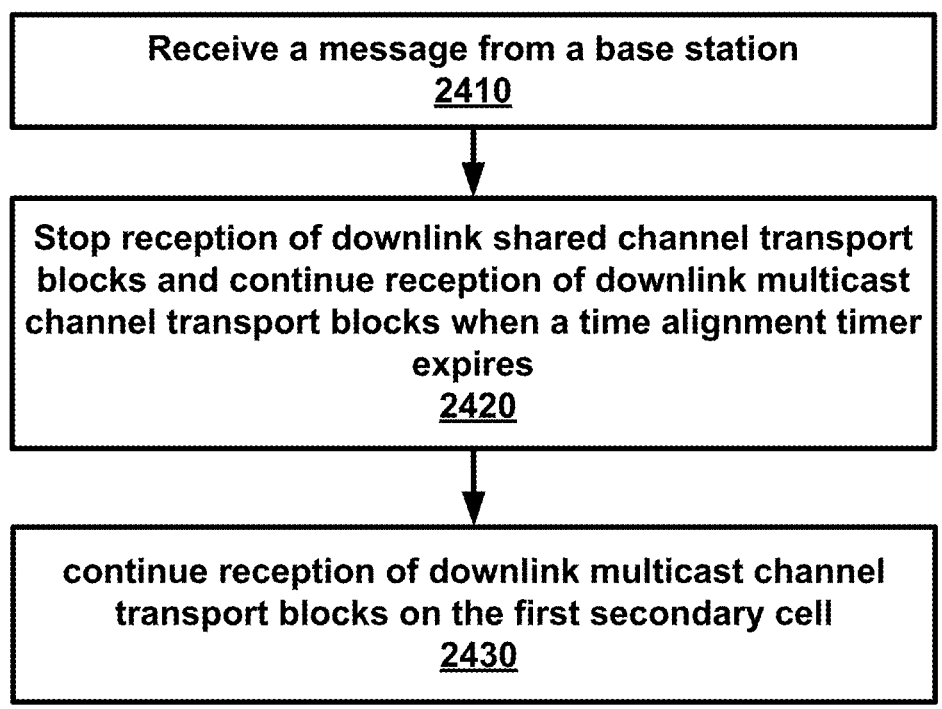
FIG. 24 is an example flow diagram as per an aspect of an embodiment of the present invention.

FIG. 24 is an example flow diagram as per an aspect of an embodiment of the present invention. A wireless device receives at least one message from a base station at 2410. The message may comprise configuration parameters of a plurality of cells. The plurality of cells may be grouped into a plurality of timing advance groups (TAGs). The plurality of cells may be grouped into a plurality of physical uplink control channel (PUCCH) groups. The PUCCH groups may comprise a primary PUCCH group and a secondary PUCCH group. The primary PUCCH group may comprise a primary cell with a primary PUCCH transmitted to a base station. The secondary PUCCH group may comprise a PUCCH secondary cell with a secondary PUCCH transmitted to the base station. The PUCCH secondary cell may be in a first TAG in the plurality of TAGs.

At 2420, reception of downlink shared channel transport blocks on a first secondary cell in the secondary PUCCH group may be stopped when a time alignment timer of the first TAG expires. The first secondary cell may be different from the PUCCH secondary cell. Reception of downlink multicast channel transport blocks may be continued on the first secondary cell at 2430.

According to an embodiment, a radio resource control layer may be notified to release the secondary PUCCH when the time alignment timer of the first TAG expires. According to an embodiment, transmission of positive acknowledgement or negative acknowledgement for downlink HARQ processes of an activated cell in the secondary PUCCH group may be stopped when the time alignment timer of the first TAG expires. According to an embodiment, transmission of channel state information for an activated cell in the secondary PUCCH group may be stopped when the time alignment timer of the first TAG expires. According to an embodiment, the first TAG may be considered out-of-sync in response to the time alignment timer being expired or not running Additionally, the first TAG may be considered in-sync in response to the time alignment timer running According to an embodiment, any configured downlink assignments received for an activated cell in the secondary PUCCH group may be cleared when the time alignment timer of the first TAG expires. According to an embodiment, transmission of uplink packets and uplink sounding reference signals on a serving cell may be continued when the time alignment timer of the first TAG expires. The serving cell may be in the secondary PUCCH group and the serving cell may not be in the first TAG. According to an embodiment, HARQ processes for downlink shared channel transport blocks on an activated cell in the secondary PUCCH group may be flushed when the time alignment timer of the first TAG expires.

According to an embodiment, the plurality of TAGs may comprise the first TAG and a second TAG. Uplink transmission timing in the first TAG may be derived employing a first cell in the first TAG. Uplink transmission timing in the second TAG may be derived employing a second cell in the second TAG. The at least one message may comprise a first time alignment timer IE for the first TAG. Additionally, the at least one message may comprise a second time alignment timer IE for a second TAG in the plurality of TAGs.

Figure 25:
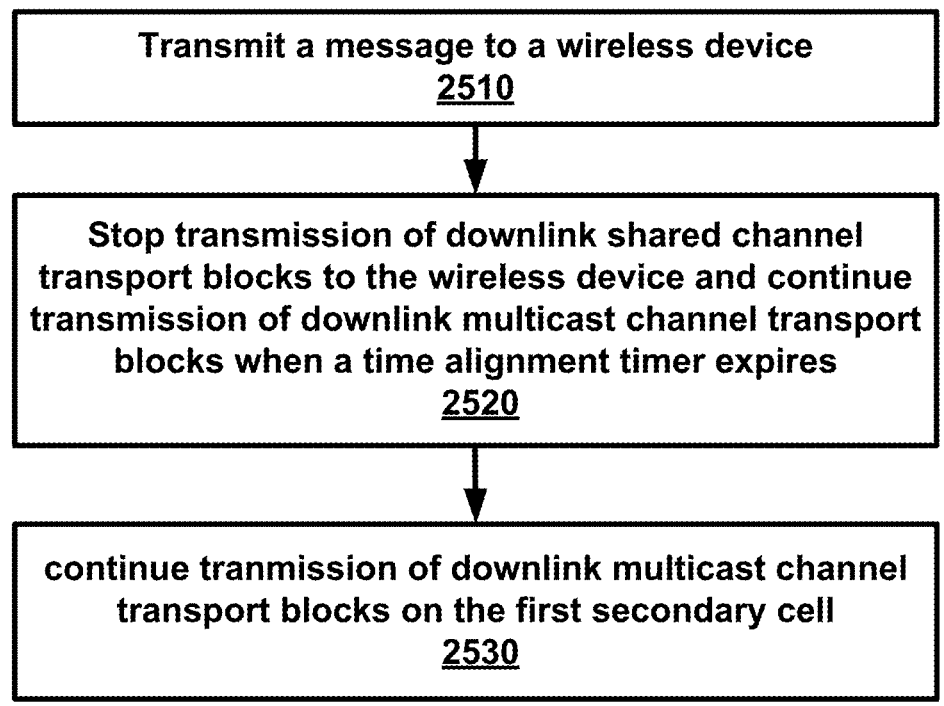
FIG. 25 is an example flow diagram as per an aspect of an embodiment of the present invention.

FIG. 25 is an example flow diagram as per an aspect of an embodiment of the present invention. A base station may transmit at least one message to a wireless device at 2510. The message may comprise configuration parameters of a plurality of cells. The plurality of cells may be grouped into a plurality of timing advance groups (TAGs). The plurality of cells may be grouped into a plurality of physical uplink control channel (PUCCH) groups. The PUCCH groups may comprise a primary PUCCH group and a secondary PUCCH group. The primary PUCCH group may comprise a primary cell with a primary PUCCH transmitted to a base station. The secondary PUCCH group may comprise a PUCCH secondary cell with a secondary PUCCH transmitted to the base station. The PUCCH secondary cell may be in a first TAG in the plurality of TAGs.

At 2520, transmission of downlink shared channel transport blocks on a first secondary cell in the secondary PUCCH group may be stopped when a time alignment timer of the first TAG expires. The first secondary cell may be different from the PUCCH secondary cell. Transmission of downlink multicast channel transport blocks may be continued on the first secondary cell at 2530.

According to an embodiment, a radio resource control layer may be notified to release the secondary PUCCH when the time alignment timer of the first TAG expires. According to an embodiment, transmission of positive acknowledgement or negative acknowledgement for downlink HARQ processes of an activated cell in the secondary PUCCH group may be stopped when the time alignment timer of the first TAG expires. According to an embodiment, transmission of channel state information for an activated cell in the secondary PUCCH group may be stopped when the time alignment timer of the first TAG expires. According to an embodiment, the first TAG may be considered out-of-sync in response to the time alignment timer being expired or not running. Additionally, the first TAG may be considered in-sync in response to the time alignment timer running According to an embodiment, any configured downlink assignments received for an activated cell in the secondary PUCCH group may be cleared when the time alignment timer of the first TAG expires. According to an embodiment, transmission of uplink packets and uplink sounding reference signals on a serving cell may be continued when the time alignment timer of the first TAG expires. The serving cell may be in the secondary PUCCH group and the serving cell may not be in the first TAG. According to an embodiment, HARQ processes for downlink shared channel transport blocks on an activated cell in the secondary PUCCH group may be flushed when the time alignment timer of the first TAG expires.

According to an embodiment, the plurality of TAGs may comprise the first TAG and a second TAG. Uplink transmission timing in the first TAG may be derived employing a first cell in the first TAG. Uplink transmission timing in the second TAG may be derived employing a second cell in the second TAG. The at least one message may comprise a first time alignment timer IE for the first TAG. Additionally, the at least one message may comprise a second time alignment timer IE for a second TAG in the plurality of TAGs.

Figure 26:
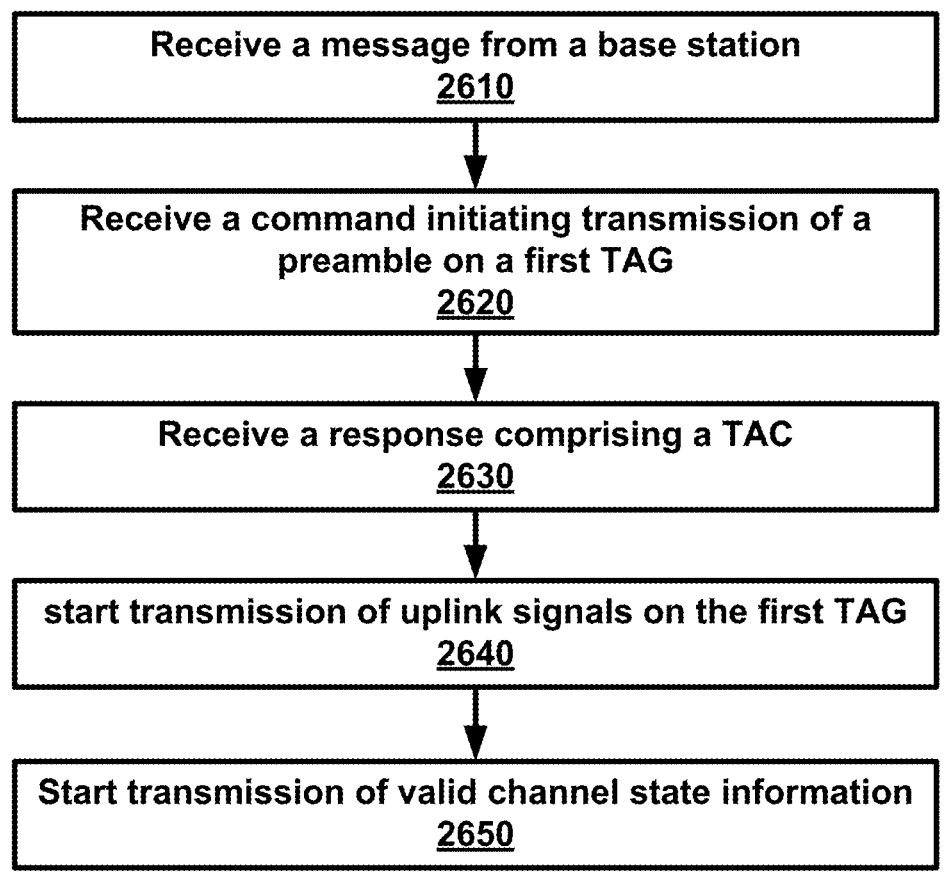
FIG. 26 is an example flow diagram as per an aspect of an embodiment of the present invention.

FIG. 26 is an example flow diagram as per an aspect of an embodiment of the present invention. A wireless device receives at least one message from a base station at 2610. The message may comprise configuration parameters of a plurality of cells. The plurality of cells may be grouped into a plurality of timing advance groups (TAGs). The plurality of cells may comprise a primary PUCCH group and a secondary PUCCH group. The primary PUCCH group may comprise a primary cell with a primary PUCCH. The secondary PUCCH group may comprise a PUCCH secondary cell with a secondary PUCCH. The PUCCH secondary cell may be in a first TAG in the plurality of TAGs.

According to an embodiment, the plurality of cells may be grouped into a plurality of PUCCH groups. The plurality of PUCCH groups may comprise a primary PUCCH group and a secondary PUCCH group. The primary PUCCH group may comprise the primary cell. The secondary PUCCH group may comprise the PUCCH secondary cell.

A command may be received at 2620 initiating transmission of a preamble on the first TAG. According to an embodiment, the command may be received when a time alignment timer of the first TAG is not running A response comprising a timing advance command (TAC) in subframe m may be received at 2630.

Transmission of uplink signals on the first TAG may be started on or before subframe m+4 at 2640. According to an embodiment, the uplink signals may comprise uplink transport blocks transmitted on a physical uplink shared channel According to an embodiment, the uplink signals may comprise sounding reference signals.

Transmission of valid channel state information (CSI) on the PUCCH secondary cell on or after subframe m+6 may be started at 2650. According to an embodiment, the CSI may be for an activated cell in the secondary PUCCH group.

According to an embodiment, a time alignment timer of the first TAG may be started on or before subframe m+4. According to an embodiment, uplink transmission timing on or after subframe m+6 may be adjusted.

According to an embodiment, an activation command may be received before receiving the command. The activation command may be received in subframe n. The activation command may be configured to activate the PUCCH secondary cell. The activation command may be configured to start a deactivation timer in subframe n+8.

Figure 27:
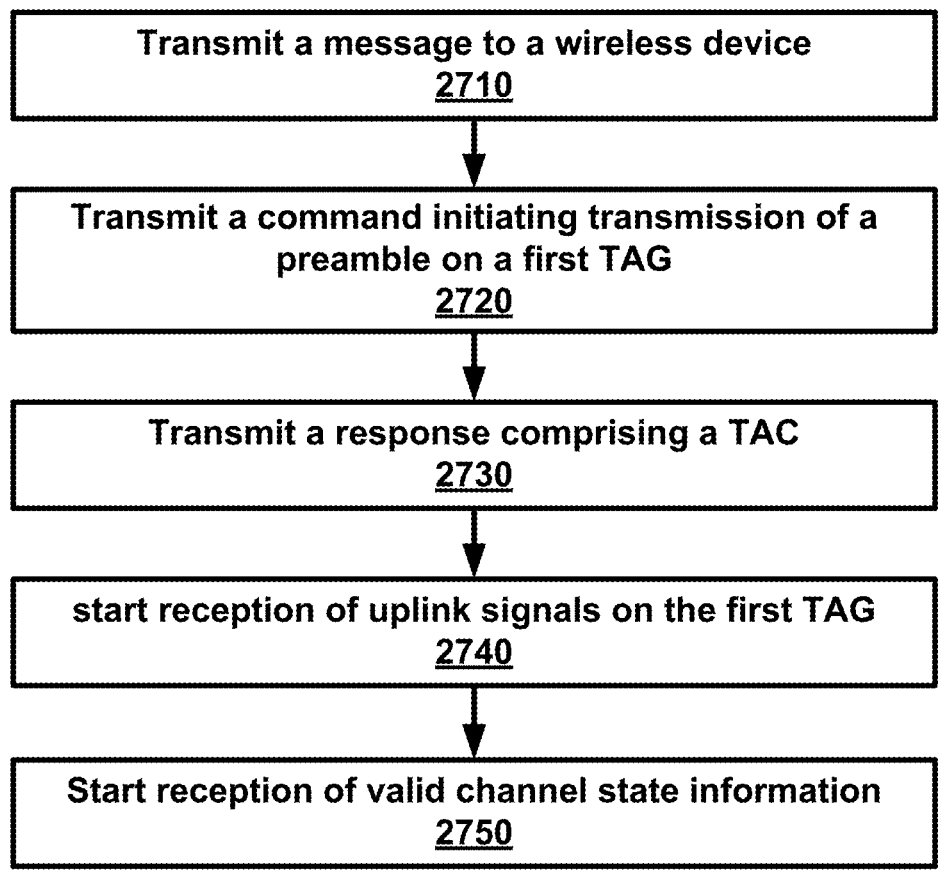
FIG. 27 is an example flow diagram as per an aspect of an embodiment of the present invention.

FIG. 27 is an example flow diagram as per an aspect of an embodiment of the present invention. A base station may transmit at least one message to a wireless device at 2710. The message may comprise configuration parameters of a plurality of cells. The plurality of cells may be grouped into a plurality of timing advance groups (TAGs). The plurality of cells may comprise a primary cell and a PUCCH secondary cell. The primary cell may comprise a primary physical uplink control channel PUCCH. The PUCCH secondary cell may comprise a secondary PUCCH. The PUCCH secondary cell may be in a first TAG in the plurality of TAGs.

According to an embodiment, the plurality of cells may be grouped into a plurality of PUCCH groups. The plurality of PUCCH groups may comprise a primary PUCCH group and a secondary PUCCH group. The primary PUCCH group may comprise the primary cell. The secondary PUCCH group may comprise the PUCCH secondary cell.

A command may be transmitted at 2720 initiating transmission of a preamble on the first TAG. According to an embodiment, the command may be transmitted when a time alignment timer of the first TAG is not running A response comprising a timing advance command (TAC) in subframe m may be transmitted at 2730. Reception of uplink signals on the first TAG may be started on or before subframe m+4 at 2740. According to an embodiment, the uplink signals may comprise uplink transport blocks transmitted on a physical uplink shared channel According to an embodiment, the uplink signals may comprise sounding reference signals.

Transmission of valid channel state information (CSI) on the PUCCH secondary cell on or after subframe m+6 may be started at 2750. According to an embodiment, the CSI may be for an activated cell in the secondary PUCCH group.

According to an embodiment, a time alignment timer of the first TAG may be started on or before subframe m+4. According to an embodiment, uplink signals with adjusted uplink transmission timing on or after subframe m+6 may be received.

According to an embodiment, an activation command may be transmitted before transmitting the command. The activation command may be transmitted in subframe n. The activation command may be configured to activate the PUCCH secondary cell. The activation command may be configured to start a deactivation timer in subframe n+8.

A primary PUCCH group may comprise a group of serving cells including PCell whose PUCCH signaling is associated with the PUCCH on PCell. A PUCCH group may comprise either primary PUCCH group or a secondary PUCCH group. A PUCCH SCell may comprise a Secondary Cell configured with PUCCH. A secondary PUCCH group may comprise a group of SCells whose PUCCH signalling is associated with the PUCCH on the PUCCH SCell. A Timing Advance Group may comprise a group of serving cells configured by an RRC and that, for the cells with an UL configured, use the same timing reference cell and the same Timing Advance value. A Primary Timing Advance Group may comprise a Timing Advance Group containing the PCell. A Secondary Timing Advance Group may comprise a Timing Advance Group not containing the PCell.

A PUCCH may be transmitted on a PCell, a PUCCH SCell (if such is configured in CA) and on a PSCell (in DC). The configured set of serving cells for a UE may therefore consists of one PCell and one or more SCells. If DC is not configured, one additional PUCCH may be configured on an SCell, the PUCCH SCell. When a PUCCH SCell is configured, an RRC may configure the mapping of each serving cell to a Primary PUCCH group or a Secondary PUCCH group (e.g., for each SCell whether the PCell or the PUCCH SCell is used for the transmission of ACK/NAKs and CSI reports).

In RRC_CONNECTED, the eNB may be responsible for maintaining the timing advance. Serving cells, having an UL to which the same timing advance applies (typically corresponding to the serving cells hosted by the same receiver) and using the same timing reference cell, may be grouped in a timing advance group (TAG). Each TAG may comprise at least one serving cell with a configured uplink, and the mapping of each serving cell to a TAG may be configured by an RRC.

When a timeAlignmentTimer expires, if the timeAlignmentTimer is associated with the pTAG, the following actions may occur: flush all HARQ buffers for all serving cells; notify RRC to release PUCCH for all serving cells; notify RRC to release SRS for all serving cells; clear any configured downlink assignments and uplink grants; and/or consider all running timeAlignmentTimers as expired. Otherwise, if the timeAlignmentTimer is associated with an sTAG, then the following actions may occur for all Serving Cells belonging to this TAG: flush all HARQ buffers; notify RRC to release SRS; and/or notify RRC to release PUCCH, if configured.

If the HARQ process is equal to the broadcast process; and/or if the timeAlignmentTimer, associated with the TAG containing the serving cell on which the HARQ feedback is to be transmitted, is stopped or expired: do not indicate the generated positive or negative acknowledgement to the physical layer.

If the UE does not have a valid TA for transmitting on an SCell then the UE may be capable to perform downlink actions related to the SCell activation command as for the SCell being activated on the PUCCH SCell no later than in subframe n+Tactivate_basic and may be capable to perform uplink actions related to the SCell activation command for the SCell being activated on the PUCCH SCell no later than in subframe n+Tdelay_PUCCH SCell and may transmit a valid CSI report for the SCell being activated on the PUCCH SCell no later than in subframe n+Tdelay_PUCCH SCell, where: Tdelay_PUCCH SCell=Tactivate_basic+T1+T2+T3.

T1 may be the delay uncertainty in acquiring the first available PRACH occasion in the PUCCH SCell. T1 may be up to 25 subframes and the actual value of T1 may depend upon the PRACH configuration used in the PUCCH SCell. T2 may be the delay for obtaining a valid TA command for the sTAG to which the SCell configured with PUCCH belongs. T2 may be up to 13 subframes. T3 may be the delay for applying the received TA for upling transmission. T3 may be 6 subframes. The above delay(s) (Tdelay_PUCCH SCell) may apply provided that: the UE has received a PDCCH order to initiate an RA procedure on the PUCCH SCell within Tactivate_basic, otherwise additional delay to activate the SCell may be expected; and/or the RA on PUCCH SCell may not interrupted by the RA on a PCell, otherwise additional delay(s) to activate the SCell may be expected.

Higher layers may indicate a 20-bit UL Grant to the physical layer. This may be referred to as the Random Access Response Grant in the physical layer.

The term "UL/DL configuration" may refer to the higher layer parameter subframeAssignment unless specified otherwise.

For a FDD and a normal HARQ operation, the UE may upon detection on a given serving cell of a PDCCH/EPDCCH with DCI format 0/4 and/or a PHICH transmission in subframe n intended for the UE, adjust the corresponding PUSCH transmission in subframe n+4 according to the PDCCH/EPDCCH and PHICH information. For an FDD-TDD and/or a normal HARQ operation and/or a PUSCH for serving cell c with frame structure type 1, the UE may upon detection of a PDCCH/EPDCCH with DCI format 0/4 and/or a PHICH transmission in subframe n intended for the UE, adjust the corresponding PUSCH transmission for serving cell c in subframe n+4 according to the PDCCH/EPDCCH and PHICH information.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the invention may also be implemented in a system comprising one or more TDD cells (e.g. frame structure 2 and/or frame structure 3-licensed assisted access). The disclosed methods and systems may be implemented in wireless or wireline systems. The features of various embodiments presented in this invention may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112.

What is claimed is:
1. A method comprising:
 receiving, by a wireless device, at least one message comprising configuration parameters of a plurality of cells, wherein:
  the plurality of cells are grouped into a plurality of timing advance groups (TAGs) comprising a primary TAG and a secondary TAG; and
  the plurality of cells are grouped into a plurality of physical uplink control channel (PUCCH) groups comprising:
   a primary PUCCH group comprising a primary cell with a primary PUCCH transmitted to a base station; and
   a secondary PUCCH group comprising a PUCCH secondary cell with a secondary PUCCH transmitted to the base station, wherein the PUCCH secondary cell is in the secondary TAG in the plurality of TAGs; and
 when a time alignment timer of the secondary TAG expires:
  notifying a radio resource control layer to release the secondary PUCCH;
  stopping transmission of positive acknowledgement or negative acknowledgement for one or more down- link HARQ processes of an activated cell in the secondary PUCCH group;

stopping reception of downlink shared channel transport blocks on a first secondary cell in the secondary PUCCH group, the first secondary cell being different from the PUCCH secondary cell; and continuing reception of downlink multicast channel transport blocks on the first secondary cell.

2. The method of claim 1, further comprising stopping one or more of the one or more downlink HARQ processes of downlink shared channel transport blocks of the activated cell in the secondary PUCCH group when the time alignment timer of the secondary TAG expires.

3. The method of claim 1, further comprising stopping receiving downlink shared channel transport blocks on the activated cell in the secondary PUCCH group when the time alignment timer of the secondary TAG expires.

4. The method of claim 1, further comprising stopping transmission of channel state information for the activated cell in the secondary PUCCH group when the time alignment timer of the secondary TAG expires.

5. The method of claim 1, wherein the secondary TAG is considered:
out-of-sync in response to the time alignment timer being expired or not running; and
in-sync in response to the time alignment timer running.

6. The method of claim 1, further comprising clearing any configured downlink assignments received for the activated cell in the secondary PUCCH group when the time alignment timer of the secondary TAG expires.

7. The method of claim 1, further comprising continuing transmission of uplink packets and uplink sounding reference signals on a serving cell when the time alignment timer of the secondary TAG expires, wherein the serving cell is in the secondary PUCCH group and the serving cell is not in the secondary TAG.

8. The method of claim 1, further comprising flushing one or more of the downlink HARQ processes for downlink shared channel transport blocks on the activated cell in the secondary PUCCH group when the time alignment timer of the secondary TAG expires.

9. The method of claim 1, wherein:
uplink transmission timing in the secondary TAG derived employing a first cell in the secondary TAG; and
uplink transmission timing in the primary TAG derived employing a second cell in the primary TAG.

10. The method of claim 1, wherein the at least one message comprises:
a first time alignment timer IE for the secondary TAG; and
a second time alignment timer IE for a primary TAG in the plurality of TAGs.

11. A method comprising:
receiving, by a wireless device, at least one message comprising configuration parameters of a plurality of cells, wherein:
the plurality of cells are grouped into a plurality of timing advance groups (TAGs) comprising a primary TAG and a secondary TAG; and
the plurality of cells are grouped into a plurality of physical uplink control channel (PUCCH) groups comprising:
a primary PUCCH group comprising a primary cell with a primary PUCCH transmitted to a base station; and
a secondary PUCCH group comprising a PUCCH secondary cell with a secondary PUCCH transmitted to the base station, wherein the PUCCH secondary cell is in the secondary TAG in the plurality of TAGs; and when a time alignment timer of the secondary TAG is stopped:
stopping transmission of positive acknowledgement or negative acknowledgement for downlink HARQ processes of an activated cell in the secondary PUCCH group;
stopping transmission of channel state information feedback for the activated cell; and
stopping reception of downlink shared channel transport blocks on a first secondary cell in the secondary PUCCH group, the secondary cell being different from the PUCCH secondary cell; and
continuing reception of downlink multicast channel transport blocks on the first secondary cell.

12. The method of claim 11, further comprising stopping reception downlink shared channel transport blocks on the activated cell in the secondary PUCCH.

13. The method of claim 11, further comprising stopping HARQ processes of downlink shared channel transport blocks of the activated cell when the time alignment timer of the secondary TAG is stopped.

14. The method of claim 11, further comprising continuing transmission of uplink packets and uplink sounding reference signals on a serving cell when the time alignment timer of the secondary TAG is stopped, wherein the serving cell is in the secondary PUCCH group and the serving cell is not in the secondary TAG.

15. The method of claim 11, wherein:
uplink transmission timing in the primary TAG derived employing a first cell in the primary TAG; and
uplink transmission timing in the secondary TAG derived employing a second cell in the secondary TAG.

16. A method comprising:
transmitting, by a base station to a wireless device, at least one message comprising configuration parameters of a plurality of cells, wherein grouped into:
the plurality of cells are grouped into a plurality of timing advance groups (TAGs) comprising a primary TAG and a secondary TAG; and
the plurality of cells are grouped into a plurality of physical uplink control channel (PUCCH) groups comprising:
a primary PUCCH group comprising a primary cell with a primary PUCCH received by the base station; and
a secondary PUCCH group comprising a PUCCH secondary cell with a secondary PUCCH received by the base station, the PUCCH secondary cell being in the secondary TAG in the plurality of TAGs; and when a time alignment timer of the secondary TAG expires:
stopping reception of channel state information on the secondary PUCCH from the wireless device;
stopping reception of positive acknowledgement or negative acknowledgement for one or more downlink HARQ processes of an activated cell in the secondary PUCCH group from the wireless device;
stopping transmission of downlink shared channel transport blocks on a secondary cell in the secondary PUCCH group, the secondary cell being different from the PUCCH secondary cell; and
continuing transmission of downlink multicast channel transport blocks on the secondary cell.

17. The method of claim 16, further comprising stopping the one or more downlink HARQ processes of downlink shared channel transport blocks of the activated cell when the time alignment timer of the secondary TAG expires, the one or more downlink HARQ processes being for transport blocks of the wireless device.

18. The method of claim 16, wherein the secondary TAG is considered:
   out-of-sync in response to the time alignment timer being expired or not running; and
   in-sync in response to the time alignment timer running.

19. The method of claim 16, wherein:
   uplink transmission timing in the secondary TAG derived employing a first cell in the secondary TAG; and
   uplink transmission timing in the primary TAG derived employing a second cell in the primary TAG.

20. The method of claim 16, wherein the at least one message comprises:
   a first time alignment timer IE for the secondary TAG; and
   a second time alignment timer IE for a primary TAG in the plurality of TAGs.

\* \* \* \* \*